US007788080B2

(12) United States Patent (10) Patent No.: US 7,788,080 B2
Graham et al. (45) Date of Patent: Aug. 31, 2010

(54) PAPER INTERFACE FOR SIMULATION ENVIRONMENTS

(75) Inventors: Jamey Graham, San Jose, CA (US); Jonathan J. Hull, San Carlos, CA (US)

(73) Assignee: Ricoh Company, Ltd. (JP)

( * ) Notice: Subject to any disclaimer, the term of this patent is extended or adjusted under 35 U.S.C. 154(b) by 448 days.

(21) Appl. No.: 11/054,122

(22) Filed: Feb. 8, 2005

(65) Prior Publication Data

US 2005/0149849 A1    Jul. 7, 2005

(51) Int. Cl.
  G06F 9/44     (2006.01)
  G06F 9/445    (2006.01)
  G06F 9/45     (2006.01)
  G06F 9/455    (2006.01)
  G06F 13/10    (2006.01)
  G06F 13/12    (2006.01)
  A63F 9/24     (2006.01)

(52) U.S. Cl. .................. 703/21; 703/22; 715/968; 715/970.1; 463/29; 463/43

(58) Field of Classification Search ............... 703/17, 703/21; 369/47.23; 434/307 R
  See application file for complete search history.

(56) References Cited

U.S. PATENT DOCUMENTS

| 4,222,069 A | 9/1980 | Groetschel |
| 4,417,239 A | 11/1983 | Demke et al. |
| 4,475,153 A | 10/1984 | Kihara et al. |
| 4,481,412 A * | 11/1984 | Fields ............. 235/462.49 |
| 4,823,303 A | 4/1989 | Terasawa |
| 4,831,610 A * | 5/1989 | Hoda et al. ........ 369/47.23 |
| 4,841,132 A | 6/1989 | Kajitani et al. |
| 5,059,126 A | 10/1991 | Kimball |
| 5,115,320 A | 5/1992 | Ebihara et al. |

(Continued)

FOREIGN PATENT DOCUMENTS

CA    2386829 A1    11/2002

(Continued)

OTHER PUBLICATIONS

The Easter Egg Archive, "Diablo 2—Secret Cow Level", published Jul. 4, 2000, http://www.eeggs.com/items/15165/html, 7 pages.*

(Continued)

*Primary Examiner*—Kamini S Shah
*Assistant Examiner*—Suzanne Lo
(74) *Attorney, Agent, or Firm*—Townsend and Townsend and Crew LLP

(57) ABSTRACT

Techniques for using a paper interface to replay time-based media information captured for a simulation and/or restart execution of a simulation program from a user-selectable time point. A static representation is generated for time-based media information captured during a simulation. The static representation may be printed on a paper medium. The paper medium on which the static representation is printed may be used to perform various operations such as replaying previously recorded time-based media information for a simulation from a user-selectable time point. The paper medium on which the static representation is printed may also be used to restart execution of a simulation program from a user-selectable time point from a previous run of the simulation program.

26 Claims, 10 Drawing Sheets

U.S. PATENT DOCUMENTS

| | | | |
|---|---|---|---|
| 5,153,831 A | 10/1992 | Yianilos | |
| 5,237,648 A | 8/1993 | Mills et al. | |
| 5,250,787 A | 10/1993 | Arii et al. | |
| 5,258,880 A | 11/1993 | Takahashi | |
| 5,309,359 A | 5/1994 | Katz et al. | |
| 5,349,658 A | 9/1994 | O'Rourke et al. | |
| 5,382,776 A | 1/1995 | Arii et al. | |
| 5,383,029 A | 1/1995 | Kojima | |
| 5,384,703 A | 1/1995 | Withgott et al. | |
| 5,404,295 A | 4/1995 | Katz et al. | |
| 5,418,948 A | 5/1995 | Turtle | |
| 5,438,426 A | 8/1995 | Miake et al. | |
| 5,442,795 A | 8/1995 | Levine et al. | |
| 5,467,288 A | 11/1995 | Fasciano et al. | |
| 5,479,600 A | 12/1995 | Wroblewski et al. | |
| 5,480,306 A | 1/1996 | Liu | |
| 5,481,666 A | 1/1996 | Nguyen et al. | |
| 5,485,554 A | 1/1996 | Lowitz et al. | |
| 5,535,063 A | 7/1996 | Lamming | |
| 5,572,651 A | 11/1996 | Weber et al. | |
| 5,576,950 A | 11/1996 | Tonomura et al. | |
| 5,596,698 A | 1/1997 | Morgan | |
| 5,596,700 A | 1/1997 | Darnell et al. | |
| 5,600,775 A | 2/1997 | King et al. | |
| 5,624,265 A * | 4/1997 | Redford et al. | 434/307 R |
| 5,627,936 A | 5/1997 | Prasad et al. | |
| 5,628,684 A * | 5/1997 | Bouedec | 463/17 |
| 5,638,543 A | 6/1997 | Pedersen et al. | |
| 5,640,193 A | 6/1997 | Wellner | |
| 5,661,506 A | 8/1997 | Lazzouni et al. | |
| 5,675,752 A | 10/1997 | Scott et al. | |
| 5,680,636 A | 10/1997 | Levine et al. | |
| 5,682,540 A | 10/1997 | Klotz, Jr. et al. | |
| 5,694,559 A | 12/1997 | Hobsen et al. | |
| 5,706,097 A | 1/1998 | Schelling et al. | |
| 5,721,897 A | 2/1998 | Rubinstein | |
| 5,737,599 A | 4/1998 | Rowe et al. | |
| 5,745,756 A | 4/1998 | Henley | |
| 5,748,805 A | 5/1998 | Withgott et al. | |
| 5,749,735 A * | 5/1998 | Redford et al. | 434/307 R |
| 5,751,283 A | 5/1998 | Smith | |
| 5,758,037 A | 5/1998 | Schroeder | |
| 5,761,655 A | 6/1998 | Hoffman | |
| 5,764,368 A | 6/1998 | Shibaki et al. | |
| 5,778,397 A | 7/1998 | Kupiec et al. | |
| 5,781,785 A | 7/1998 | Rowe et al. | |
| 5,784,616 A | 7/1998 | Horvitz | |
| 5,790,114 A | 8/1998 | Geaghan et al. | |
| 5,793,869 A | 8/1998 | Claflin, Jr. | |
| 5,804,803 A | 9/1998 | Cragun et al. | |
| 5,809,318 A | 9/1998 | Rivette et al. | |
| 5,819,301 A | 10/1998 | Rowe et al. | |
| 5,832,474 A | 11/1998 | Lopresti et al. | |
| 5,838,317 A | 11/1998 | Bolnick et al. | |
| 5,857,185 A | 1/1999 | Yamaura | |
| 5,860,074 A | 1/1999 | Rowe et al. | |
| 5,869,819 A | 2/1999 | Knowles et al. | |
| 5,870,770 A | 2/1999 | Wolfe | |
| 5,873,107 A | 2/1999 | Borovoy et al. | |
| 5,892,536 A | 4/1999 | Logan et al. | |
| 5,894,333 A | 4/1999 | Kanda et al. | |
| 5,895,476 A | 4/1999 | Orr | |
| 5,898,166 A | 4/1999 | Fukuda | |
| 5,898,709 A | 4/1999 | Imade et al. | |
| 5,899,700 A | 5/1999 | Williams et al. | |
| 5,926,285 A | 7/1999 | Takahashi | |
| 5,933,829 A | 8/1999 | Durst et al. | |
| 5,933,841 A | 8/1999 | Schumacher et al. | |
| 5,938,727 A | 8/1999 | Ikeda | |
| 5,939,699 A | 8/1999 | Perttunen | |
| 5,941,936 A | 8/1999 | Taylor | |
| 5,943,679 A | 8/1999 | Niles et al. | |
| 5,945,998 A | 8/1999 | Eick | |
| 5,946,678 A | 8/1999 | Aalbersberg | |
| 5,949,879 A | 9/1999 | Berson et al. | |
| 5,950,187 A | 9/1999 | Tsuda | |
| 5,956,716 A | 9/1999 | Kenner et al. | |
| 5,962,839 A | 10/1999 | Eskildsen | |
| 5,978,773 A | 11/1999 | Hudetz et al. | |
| 5,986,692 A | 11/1999 | Logan et al. | |
| 5,987,454 A | 11/1999 | Hobbs | |
| 5,999,173 A | 12/1999 | Ubillos | |
| 6,005,562 A | 12/1999 | Shiga et al. | |
| 6,006,218 A | 12/1999 | Breese et al. | |
| 6,006,241 A | 12/1999 | Pumaveja et al. | |
| 6,009,204 A | 12/1999 | Ahmad | |
| 6,021,403 A | 2/2000 | Horvitz et al. | |
| 6,026,409 A | 2/2000 | Blumenthal | |
| 6,028,601 A | 2/2000 | Machiraju et al. | |
| 6,055,542 A | 4/2000 | Nielsen et al. | |
| 6,061,758 A | 5/2000 | Reber et al. | |
| 6,076,733 A | 6/2000 | Wilz, Sr. et al. | |
| 6,076,734 A | 6/2000 | Dougherty et al. | |
| 6,081,261 A | 6/2000 | Wolff et al. | |
| 6,085,205 A | 7/2000 | Peairs et al. | |
| 6,088,702 A | 7/2000 | Plantz et al. | |
| 6,094,648 A | 7/2000 | Aalbersberg | |
| RE36,801 E | 8/2000 | Logan et al. | |
| 6,098,082 A | 8/2000 | Gibbon et al. | |
| 6,101,503 A | 8/2000 | Cooper et al. | |
| 6,108,656 A | 8/2000 | Durst et al. | |
| 6,111,567 A | 8/2000 | Savchenko et al. | |
| 6,125,229 A | 9/2000 | Dimitrova et al. | |
| 6,138,151 A | 10/2000 | Reber et al. | |
| 6,148,094 A | 11/2000 | Kinsella | |
| 6,151,059 A | 11/2000 | Schein et al. | |
| 6,152,369 A | 11/2000 | Wilz, Sr. et al. | |
| 6,160,633 A | 12/2000 | Mori | |
| 6,167,353 A * | 12/2000 | Piernot et al. | 702/94 |
| 6,182,090 B1 | 1/2001 | Peairs | |
| 6,199,042 B1 | 3/2001 | Kurzweil | |
| 6,199,048 B1 | 3/2001 | Hudetz et al. | |
| 6,211,869 B1 | 4/2001 | Loveman et al. | |
| 6,256,638 B1 | 7/2001 | Dougherty et al. | |
| 6,262,724 B1 | 7/2001 | Crow et al. | |
| 6,297,812 B1 | 10/2001 | Ohara et al. | |
| 6,301,586 B1 | 10/2001 | Yang et al. | |
| 6,307,956 B1 | 10/2001 | Black | |
| 6,330,976 B1 | 12/2001 | Dymetman et al. | |
| 6,360,057 B1 | 3/2002 | Tsumagari et al. | |
| 6,360,234 B2 | 3/2002 | Jain et al. | |
| 6,369,811 B1 | 4/2002 | Graham et al. | |
| 6,421,067 B1 | 7/2002 | Kamen et al. | |
| 6,430,554 B1 | 8/2002 | Rothschild | |
| 6,434,561 B1 | 8/2002 | Durst, Jr. | |
| 6,448,979 B1 | 9/2002 | Schena et al. | |
| 6,449,608 B1 | 9/2002 | Morita et al. | |
| 6,476,834 B1 | 11/2002 | Doval et al. | |
| 6,486,896 B1 | 11/2002 | Ubillos | |
| 6,496,856 B1 | 12/2002 | Kenner et al. | |
| 6,502,756 B1 | 1/2003 | Fahraeus | |
| 6,504,620 B1 | 1/2003 | Kinjo | |
| 6,505,153 B1 | 1/2003 | Van Thong et al. | |
| 6,518,986 B1 | 2/2003 | Mugura | |
| 6,529,920 B1 | 3/2003 | Arons et al. | |
| 6,535,639 B1 | 3/2003 | Uchihachi et al. | |
| 6,542,933 B1 | 4/2003 | Durst, Jr. | |
| 6,544,294 B1 | 4/2003 | Greenfield et al. | |
| 6,546,385 B1 | 4/2003 | Mao et al. | |
| 6,567,980 B1 | 5/2003 | Jain et al. | |
| 6,568,595 B1 | 5/2003 | Russell et al. | |
| 6,581,070 B1 | 6/2003 | Gibbon et al. | |
| 6,587,859 B2 | 7/2003 | Dougherty et al. | |
| 6,596,031 B1 | 7/2003 | Parks | |

| | | |
|---|---|---|
| 6,600,501 B1 | 7/2003 | Israel et al. |
| 6,608,563 B2 | 8/2003 | Weston et al. |
| 6,623,528 B1 | 9/2003 | Squilla et al. |
| 6,625,334 B1 | 9/2003 | Shiota et al. |
| 6,636,869 B1 | 10/2003 | Reber et al. |
| 6,643,666 B1 | 11/2003 | Kernz |
| 6,647,534 B1 | 11/2003 | Graham |
| 6,647,535 B1 | 11/2003 | Bozdagi et al. |
| 6,651,053 B1 | 11/2003 | Rothschild |
| 6,665,838 B1 | 12/2003 | Brown et al. |
| 6,675,165 B1 | 1/2004 | Rothschild |
| 6,684,368 B1 | 1/2004 | Hull et al. |
| 6,701,369 B1 | 3/2004 | Philyaw |
| 6,728,466 B1 | 4/2004 | Tanaka |
| 6,745,234 B1 | 6/2004 | Philyaw et al. |
| 6,753,883 B2 | 6/2004 | Schnea et al. |
| 6,760,541 B1 | 7/2004 | Ohba |
| 6,760,884 B1 | 7/2004 | Vertelney et al. |
| 6,766,363 B1 | 7/2004 | Rothschild |
| 6,771,283 B2 | 8/2004 | Carro |
| 6,772,947 B2 | 8/2004 | Shaw |
| 6,781,609 B1 | 8/2004 | Barker et al. |
| 6,843,419 B2 | 1/2005 | Rathus et al. |
| 6,845,913 B2 | 1/2005 | Madding et al. |
| 6,865,608 B2 | 3/2005 | Hunter |
| 6,865,714 B1 | 3/2005 | Liu et al. |
| 6,871,780 B2 | 3/2005 | Nygren et al. |
| 6,883,162 B2 | 4/2005 | Jackson et al. |
| 6,886,750 B2 | 5/2005 | Rathus et al. |
| 6,898,709 B1 | 5/2005 | Teppler |
| 6,923,721 B2 * | 8/2005 | Luciano et al. ............... 463/24 |
| 6,931,594 B1 | 8/2005 | Jun |
| 6,946,672 B1 | 9/2005 | Lapstun et al. |
| 6,950,623 B2 | 9/2005 | Brown et al. |
| 6,950,989 B2 | 9/2005 | Rosenzweig et al. |
| 6,966,495 B2 | 11/2005 | Lynggaard et al. |
| 6,993,573 B2 | 1/2006 | Hunter |
| 6,996,782 B2 | 2/2006 | Parker et al. |
| 7,051,018 B2 | 5/2006 | Reed et al. |
| 7,070,103 B2 | 7/2006 | Melick et al. |
| 7,089,420 B1 | 8/2006 | Durst et al. |
| 7,093,191 B1 | 8/2006 | Jain et al. |
| 7,131,058 B1 | 10/2006 | Lapstun |
| 7,134,016 B1 | 11/2006 | Harris |
| 7,134,074 B2 | 11/2006 | Munetsugu et al. |
| 7,149,957 B2 | 12/2006 | Hull et al. |
| 7,152,206 B1 | 12/2006 | Tsuruta |
| 7,181,502 B2 | 2/2007 | Incertis |
| 7,215,436 B2 | 5/2007 | Hull et al. |
| 7,228,492 B1 | 6/2007 | Graham |
| 7,249,324 B2 | 7/2007 | Nakamura et al. |
| 7,263,659 B2 | 8/2007 | Hull et al. |
| 7,263,671 B2 | 8/2007 | Hull et al. |
| 7,266,782 B2 | 9/2007 | Hull et al. |
| 7,280,738 B2 | 10/2007 | Kauffman et al. |
| 7,495,795 B2 | 2/2009 | Graham et al. |
| 2001/0005203 A1 | 6/2001 | Wiernik |
| 2001/0013041 A1 | 8/2001 | Beck et al. |
| 2001/0044810 A1 | 11/2001 | Timmons |
| 2002/0011518 A1 | 1/2002 | Goetz et al. |
| 2002/0023957 A1 | 2/2002 | Michaelis et al. |
| 2002/0036800 A1 | 3/2002 | Nozaki |
| 2002/0047870 A1 | 4/2002 | Carro |
| 2002/0059342 A1 | 5/2002 | Gupta et al. |
| 2002/0066782 A1 | 6/2002 | Swaminathan |
| 2002/0070982 A1 | 6/2002 | Hill et al. |
| 2002/0087598 A1 | 7/2002 | Carro |
| 2002/0095460 A1 | 7/2002 | Benson |
| 2002/0099452 A1 | 7/2002 | Kawai |
| 2002/0116575 A1 | 8/2002 | Toyomura et al. |
| 2002/0134699 A1 | 9/2002 | Bradfield et al. |
| 2002/0135808 A1 | 9/2002 | Parry |
| 2002/0165769 A1 | 11/2002 | Ogaki et al. |
| 2002/0172498 A1 | 11/2002 | Esenyan et al. |
| 2002/0199149 A1 | 12/2002 | Nagasaki et al. |
| 2003/0009773 A1 | 1/2003 | Carlson |
| 2003/0014615 A1 | 1/2003 | Lynggaard |
| 2003/0024975 A1 | 2/2003 | Rajasekharan |
| 2003/0025951 A1 | 2/2003 | Pollard et al. |
| 2003/0046152 A1 | 3/2003 | Colas et al. |
| 2003/0052897 A1 | 3/2003 | Lin |
| 2003/0065665 A1 | 4/2003 | Kinjo |
| 2003/0065925 A1 | 4/2003 | Shindo et al. |
| 2003/0076521 A1 | 4/2003 | Li et al. |
| 2003/0084462 A1 | 5/2003 | Kubota et al. |
| 2003/0086409 A1 | 5/2003 | Karas et al. |
| 2003/0088582 A1 | 5/2003 | Pflug |
| 2003/0117652 A1 | 6/2003 | Lapstun |
| 2003/0156589 A1 | 8/2003 | Suetsugu |
| 2003/0231198 A1 | 12/2003 | Janevski |
| 2004/0006577 A1 | 1/2004 | Rix |
| 2004/0008209 A1 | 1/2004 | Adams et al. |
| 2004/0015524 A1 | 1/2004 | Chalstrom et al. |
| 2004/0037540 A1 | 2/2004 | Frohlich et al. |
| 2004/0049681 A1 | 3/2004 | Diehl et al. |
| 2004/0064338 A1 | 4/2004 | Shiota et al. |
| 2004/0064339 A1 | 4/2004 | Shiota et al. |
| 2004/0070594 A1 | 4/2004 | Burke |
| 2004/0071441 A1 | 4/2004 | Foreman et al. |
| 2004/0100506 A1 | 5/2004 | Shiota et al. |
| 2004/0118908 A1 | 6/2004 | Ando et al. |
| 2004/0128514 A1 | 7/2004 | Rhoads |
| 2004/0143459 A1 | 7/2004 | Engleson et al. |
| 2004/0167895 A1 | 8/2004 | Carro |
| 2004/0181747 A1 | 9/2004 | Hull et al. |
| 2004/0181815 A1 | 9/2004 | Hull et al. |
| 2004/0229195 A1 | 11/2004 | Marggraff et al. |
| 2004/0247298 A1 | 12/2004 | Ohba |
| 2005/0038794 A1 | 2/2005 | Piersol et al. |
| 2005/0083413 A1 | 4/2005 | Reed et al. |
| 2005/0091596 A1 | 4/2005 | Anthony et al. |
| 2005/0213153 A1 | 9/2005 | Hull et al. |
| 2005/0216838 A1 | 9/2005 | Graham |
| 2005/0216852 A1 | 9/2005 | Hull et al. |
| 2005/0223322 A1 | 10/2005 | Graham et al. |
| 2005/0254069 A1 | 11/2005 | Ryu et al. |
| 2006/0043193 A1 | 3/2006 | Brock |
| 2006/0136343 A1 | 6/2006 | Coley et al. |
| 2006/0171559 A1 | 8/2006 | Rhoads |

FOREIGN PATENT DOCUMENTS

| | | |
|---|---|---|
| EP | 248 403 A2 | 12/1987 |
| EP | 378 848 A2 | 7/1990 |
| EP | 737 927 A2 | 10/1996 |
| EP | 459 174 B1 | 11/1996 |
| EP | 762 297 A2 | 3/1997 |
| EP | 788 063 A2 | 6/1997 |
| EP | 788 064 A2 | 6/1997 |
| EP | 802 492 A1 | 10/1997 |
| GB | 2 137 788 A | 10/1984 |
| GB | 2 156 118 A | 10/1985 |
| GB | 2 234 609 A | 2/1991 |
| GB | 2 290 898 A | 1/1996 |
| GB | 2331378 * | 5/1999 |
| JP | 04-021165 A | 1/1992 |
| JP | 8-297677 A | 11/1996 |
| WO | WO 99/18523 A1 | 4/1999 |
| WO | WO 02/082316 A1 | 10/2002 |

OTHER PUBLICATIONS

J.C. Herz, "Cheating Death Has Never Been Easier", The New York Times, Mar. 4, 1999, ProQuest, 4 pages.*
Blizzard Entertainment, "Diablo II" 2000, 7 pages.*

Screenshot and Demo Guide Archive, City of Heroes Forums, May 8, 2004, 19 pages, http://boards.cityofheroes.com/archive/index.php/t-111636.html.*

"Demo Recording", City of Heroes Wiki, May 15, 2008, 7 pages, http://cityofheroes.wikia.com/wiki/Demo_Recording.*

"How to make videos in the Half-life/Source Engine", Oct. 25, 2007, 7 pages, http://www.puttputt.ca/wp-content/uploads/2007/10/h12movie.pdf.*

"StarCraft: Brood War v1.08b", May 26, 2001, 2 pages, http://www.megagames.com/news/html/patches/starcraftbroodwary108b.shtml.*

"Replays", GosuGamers StarCraft, May 25, 2003, 3 pages, http://www.gosugamers.net/starcraft/replays.php?&order=datum&sort=asc.*

"The Army's Virtual World," pp. 1-6 downloaded from http://www.g4tv.com/screensavers/features/492/The_Armys_Virtual_World.html on Mar. 16, 2005.

Becker, D., "Strategy: Outside the box," *CNET News.com*, Dec. 9, 2003, pp. 1-7, downloaded Mar. 15, 2005.

Becker, D., "Players: clash of the titans," *CNET News.com*, Dec. 10, 2003, pp. 1-6, downloaded Mar. 15, 2005.

Borland, J., "A new prime time," *CNET News.com* pp. 1-7, downloaded Mar. 15, 2005

Gaudiosi, j., "TV Execs Go Gaga Over Gaming," *Wired News*, pp. 1-3, downloaded Mar. 15, 2005.

Takahashi, D., "Some Gamers Scoring Amid Sales Slump, Sales of Video Game Hardware, Software and Peripherals Fall in 2003," *San Jose Mercury News*, Jan. 22, 2004.

"The Unofficial Half-Life MOD FAQ version 2.6," pp. 1-12 downloaded from http://www.planethalflife.com/botman/MOD_FAQ.shtml on Mar. 15, 2005.

"Study: Women over 40 biggest online gamers," *CNN Technology*, Feb. 11, 2004, pp. 1-2 downloaded from http://www.cnn.com/2004/TECH/fun.games/02/11/video.games.women.reut/ on Mar. 15, 2005.

Acrobat Reader Version 2.0 (software application), Adobe Systems Incorporated, screenshots Figures 1-10 (1994).

Adobe Premiere (video editing software) from http://www.adobe.com (2002).

Adobe Acrobat Reader 3.0 screen dumps (fig. 1-3), (1996).

Adobe Systems. Inc., "Adobe Photoshop 4.0 User Guide for Macintosh and Windows," pp. 30-31 (1996).

Apple Macintosh system 7 reference manual, pp. 30-31 (1991).

Ball et al. "Software Visualization in the Large", IEEE Computer, 29: 33-43 (1996).

Begole et al., "Flexible Collaboration Transparency," doc. ID: ncstrl.vatech_cs/TR-98-11, Virginia Polytechnic Institute and State University (1998).

Begole et al., "Supporting Worker Independence in Collaboration Transparency," doc. ID: ncstrl.vatech_cs/TR-98-12, Virginia Polytechnic Institute and State University (1998).

Bobick et al. "A State Based Approach to the Representation and Recognition of Gesture," IEEE Trans. on Pattern Analysis and Machine Intelligence, pp. 1325-1337 (1997).

Boguraev et al. "Salience-Based Content Characterisation of Text Documents," *Proceedings of the ACL/EACL Workshop on Intellegent* [Sic] *Scalable Text Summarization*, 1997. Topic identification, Discourse-based summarization. pp. 1-12 (1997).

Boreczky, J. et al. "An Interactive Comic Book Presentation for Exploring Video," Conference on Human factors in Computing Systems (CHI 2000), ACM Press, pp. 185-192, 2000.

Boykin et al, "Improving Broadcast News Segmentation Processing," IEEE Multimedia '99 (1999).

Boykin et al. "Machine learning of Event Segmentation for News on Demand," Communications of the ACM, 43:35-41(2000).

Brandow et al. "Automatic Condensation of Electronic Publications by Sentence Selection," Information Processing and Management, 31(5):675-685 (1995).

Brown et al. "Automatic Content-Based Retrieval of Broadcast News," ACM Multimedia 5, San Francisco, CA (1995).

Byrd, D., "A Scrollbar-based Visualization for Document Navigation," doc. ID: xxx.cs.IR/9902028, Computing Research Repository: Information Retrieval (1999).

Chen et al. "Emotion Recognition from Audiovisual Information, " Proc. IEEE Workshop on Multimedia Signal Processing, Los Angeles, CA, USA, pp. 83-88 (1998).

Chen et al. "ViBE: A Video Indexing and Browsing Environment." Proceedings of the SPIE Conference on Multimedia Storage and Archiving Systems Sep. 20-22, 1999, Boston 3846:148-164 (1999).

Chiu et al. "NoteLook: Taking Notes in Meetings with Digital Video and Ink," ACM Multimedia 99 Orlando, (1999).

Chiu et al. "Automatically linking multimedia meeting documents by image matching," Proceedings of Hypertext '00, ACM New York, pp. 244-245 (2000).

Christel et al. "Evolving Video Skims into Useful Multimedia Abstractions," Proceedings of the CHI '98 Conference on Human Factors in Computing Systems (Los Angeles, CA, Apr. 1998), pp. 171-178 (1998).

Christel et al. "Information Visualization within a Digital Video Library," Journal of Intelligent Information Systems 11:235-257 (1998).

Dellaert et al. "Recognizing emotion in speech," Proceedings ICSLP 96. Fourth International Conference on Spoken Language Processing New York (Cat. No. 96TH8206). IEEE. vol:1970-1973 (1996).

Dimitrova et al. "Video Keyframe Extraction and Filtering: A Keyframe is not a Keyframe to Everyone," CIKM 1997:113-120 (1997).

Doermann et al. "Applying Algebraic and differential invarients for logo recognition," Machine Vision and Applications 9:73-86 (1996).

Donato et al. "Classifying Facial Actions", IEEE Trans. on Pattern Analysis and Machine Intelligence, 21:974-989 (1999).

Drucker et al. "SmartSkip: Consumer Level Browsing and Skipping of Digital Video Content," Paper: Technology to Help People Find Information, vol. No. 4, Issue No. 1, pp. 219-226, Minneapolis, Minnesota, USA, (Apr. 20-25, 2002).

Essa et al. Coding Analysis Interpretation and Recognition of Facial Expressions, IEEE Trans. on Pattern Analysis and Machine Intelligence. 19:757-763 (1997).

Face recognition techniques described at web site http://www.vision-ics.com (2002).

"Flexible JAMM Screenshots", downloaded from internet site http://simon.cs.ct.edu/-jamm May 4, 2000.

Foote, Jonathan, et al. "An Intelligent Media Browser using Automatic Multimodal Analysis," ACM Multimedia 8, Bristol, UK (1998).

"Fujitsu Markets Facsimile Connection System for Computer I/O," *Comline Telecommunications*, Nov. 1989, p. 5.

Furui et al. "Japanese Broadcast News Transcription and Information Extraction," Communications of the ACM, 43(2):71-73, Feb 2000.

Gauvain et at. "Transcribing Broadcast News for Audio and Video Indexing," Communications of the ACM, 43:64-70 (2000).

Gibbon "Generating Hypermedia Documents from Transcriptions of Television Programs Using Parallel Text Alignment,"*Handbook of Internet and Multimedia Systems and Applications*, David C. Gibbon; CRC Press, (1998).

Gliedman "Virtual Office Managers," Computer Shopper, 18:290 (1998).

Gordon "Using annotated video as an information retrieval interface," ACM Proceedings of the 5th international Conference on Intelligent User Interfaces New Orleans pp. 133-140 (2000).

Greenberg et al., "Sharing fisheye views in relaxed-WYSIWIS groupware applications," *Proceedings of Graphics Interface*, Toronto, Canada, May 22-24, 1995, Distributed by Morgan-Kaufmann, pp. 28-38, http://www.cpsc.ucalgary.ca/grouplab/papers/1996/96-Fisheye.GI/gi96 fisheye.html.

Grunin, L., "Action," *PC Magazine*, 12(15):240 (1993).

"Hang on—Blue Sky's WinHelp is on the way," *PC Week*, p. 59, Jul. 1995.

Hauptmann et al. "Text, speech and vision for video segmentation: the informedia project," Proc. AAAI Fall Symp. Computational Models for Integrating Language and Vision, Boston, MA, Nov. 10-12, 1995.

Hauptmann et al. "Story Segmentation and Detection of Commercials in Broadcast News Video," Advances in Digital Libraries Conference, Santa Barbara, CA, Apr. 22-23, 1998.

He et al. "Comparing Presentation Summaries: Slides vs. Reading vs. Listening," Conference on Human factors in Computing Systems (CHI 2000), Apr. 1-6, 2000.

Hearst et al. "TileBars: Visualization of Term Distribution Information in Full Text Information Access," *Proceedings of the ACM SIGCHI Conference on Human Factors in Computing Systems (CHI)*, Denver, CO., May 1995, pp. 1-8, http://www.acm.org/sigchi/chi95/Electronic/documnts/papers/mah bdy htm.

Hecht "Embedded data glyph Technology for Hardcopy Digital Documents," Proc. SPIE 2171:341-352 (1994).

Hecht "Printed Embedded Data Graphical User Interfaces," IEEE Computer, Mar. 2001.

Hill et al. "Edit Wear and Read Wear", ACM, pp. 3-9 (May 3-7, 1992).

Hu et al. "Multimedia Description Framework (MDF) for content descriptions of Audio/Video Documents," Fourth ACM Conference on Digital Libraries (DL '99) Aug. 11-14, 1999.

IBM Technical Disclosure Bulletin, "Quick Selection of Window Environment Coordinates", 35:57-60, ISS # 4B, (1992).

"IBM, Partners Team on Web-Based Image Search, Printing Sep. 29, 1995," Newsbytes News Network, Sep. 1995.

Identitech, "Identitech announces FYI 2.5.2 release with NT object server, SmartForm, and ODBC," Business Editors, Jul. 1996.

"Identitech Unysis: Unysis wins Florida Housing Finance Agency Contract; Identitech provides workflow software solution," Business Editors/Computer Writers, Jun. 1995.

Ioffe et al. "Finding people by sampling," Proc. International Conference on Computer Vision, pp. 1092-1097 (1999).

Jin et al. "Topic Tracking for Radio, TV Broadcast, and Newswire," Proceedings of the DARPA Broadcast News Workshop, Feb. 28-Mar. 3, 1999, Herndon, VA.

Komlodi et al. "Key Frame Preview Techniques for Video Browsing," (Proceedings of the 3rd ACM International Conference on Digital Libraries, Jun. 23-26, 1998, Pittsburgh, pp. 118-125 (1998).

Lam et al. "Automatic document classification based on probabilistic reasoning: model and performance analysis," *IEEE*, 3:2719-2723 (1997).

Langley "An Analysis of Bayesian Classifiers," Proceedings of the Tenth National Conference on Artificial Intelligence, pp. 223-228, 1992.

Langley "Induction of Selective Bayesian Classifiers," Proceedings of the Tenth National Conference on Uncertainty in Artificial Intelligence, pp. 400-406, (1994).

Li et al. "Automatic Text Detection and Tracking in Digital Video," IEEE Transactions on Image Processing—Special Issue on Image and Video Processing for Digital Libraries, 9:147-156 (2000).

Li et al. "Text Extraction and Recognition in Digital Video," Proceedings of Third IAPR Workshop on Document Analysis Systems, pp. 119-128, 1998.

Li et al. "Vision: a digital video library," Proceedings of the 1st ACM International Conference on Digital Libraries, pp. 19-27, 1996.

Liang et al. "Practical video indexing and retrieval system," *SPIE*, 3240:294-303 (1988).

Lienhart et al. "On the Detection and Recognition of Television Commercials," Proc. IEEE Conf. on Multimedia Computing and Systems, Ottawa, Canada, pp. 509-516, Jun. 1997.

Lison et al., "Sight and Sound " *Unix Review*, 7(10):76-86 (1989).

Ma et al. "An Indexing and Browsing System for Home Video," Invited paper, EUSIPCO '2000, 10th European Signal Processing Conference, Sep. 5-8, 2000, Tampere, Finland.

Manber "The Use of Customized Emphasis in Text Visualization," *Proceedings of 1997 IEEE Conf. on Information Visualization*, pp. 132-138, (1997).

Maybury "News on Demand," Communications of the ACM, 43:33-34 (2000).

Maybury et al. "Segmentation, Content Extraction and Visualization of Broadcast News Video Using Multistream Analysis," AAAI Paper (1997).

Maybury et al. "Multimedia Summaries of Broadcast News," International Conference on Intelligent Information Systems pp. 447-449 (1997).

Maybury et al. "Multimedia Summaries of Broadcast News," International Conference on Intelligent Information Systems, Dec. 8-10, 1997.

Merialdo et al. "Automatic Construction of Personalized Tv News Programs," Seventh ACM International Multimedia Conference, Orlando Nov. 1999.

Merlino et al. "Broadcast News Navigation using Story Segmentation," Advanced Information Systems Center, The MITRE Corporation (1997).

Merlino et al. "Broadcast News Processing Techniques," MITRE Technical Report, MTR 99B0000031, Apr. 1999.

Mohan "Text-based search of TV news stories," Proc. SPIE 2916:2-13 (1996).

Myers et al "Multi-View Intelligent Editor for Digital Video Libraries," First ACM and IEEE Joint Conference on Digital Libraries, Jun. 24-28, 2001, Roanoke, VA, pp. 106-115.

Oh et al. "Efficient and Cost-effective Techniques for Browsing and Indexing Large Video Databases," SIGMOD Conference 2000: 415-426.

Okada et al., "Development of Application Programs for Distributed Processing Equipment," *Review of the Electrical Communication Laboratories*, 34(4):465-471 (1986).

Jang et al. "Improving acoustic models with captioned multimedia speech," Proceedings IEEE International Conference on Multimedia Computing and Systems, 2:767-71 (1999).

Rowley et al. "Neural network-based face detection," IEEE Transactions on Pattern Analysis and Machine Intelligence,20:23-38 (1998).

Schweighofer et al. "The Automatic Generation of Hypertext Links in Legal Documents," *Lecture Notes in Computer* Science, vol. 1134, Wagner et al., eds., from 7th Int. Cont., DEXA 96', held Sep. 1996 in Zurich, Switzerland (1996).

Shahraray et al. "Automated Authoring of Hypermedia Documents of Video Programs," *ACM Multimedia* 95, Nov. 5-9, 1995, San Francisco, CA (1995).

Shahraray et al. "Automatic generation of pictorial transcripts of video programs," Proceedings of the SPIE- Int. Soc. Opt. Eng. 2417:512-518 (1995).

Shahraray et al. "Pictorial transcripts: multimedia processing applied to digital library creation," 1997 IEEE First Workshop on Multimedia Signal Processing pp. 581-586 (1997).

Product Brochure, Shutterfly, downloaded from http://www.shutterfly.com on Mar. 15, 2005 (10 pages).

Smith et al. "Video Skimming and Characterization through the Combination of Image and Language Understanding," Computer Vision and Pattern Recognition IEEE 1997.

Sodergard et al., "Integrated multimedia publishing—combining TV and newspaper content on personal channels," downloaded from http:www8.org/w8-papers/lb-multimedia/integrated/integrated. html on Apr. 4, 2002, pp. 1-22.

Sonmez et al. "Multiple speaker tracking and detection: handset normalization and duration scoring," Digital Signal Processing 10:133-143 (2000).

"Spry Inc.'s Internet Front End Picked for PSI Cable Internet Service," *Information & Interactive Services Report*, 15(7), (1994).

Strattner, A., "HP pioneers I-TV peripheral market," *Computer Shopper*, 14(2):71 (1994).

Suda et al. "Logo and word matching using a general approach to signal registration," Fourth International Conference on Document Analysis and Recognition, Ulm, Germany, Aug. 18-20, 1997, pp. 61-65.

Sumita et al. "Document Structure Extraction for Interactive Document Retrieval Systems," Proceedings of SIGDOC 93, pp. 301-310, (1993).

Taghva et al. "An Evolution of an Automatic Markup System," *SPIE*, 2422:317-327 (1995).

Taxt "Segmentation of Document Images," IEEE 11:1322-1329 (1989).

Tennenhouse et al. "A software-oriented approach to the design of media processing environments," Proceedings of the IEEE International Conference on Multimedia Computing and Systems, pp. 435-444 (1994).

Tonomura et al. "VideoMAP and VideoSpaceIcon : tools for anatomizing video content," Proc. INTERCHI '93 ACM pp. 131-136 (1993).

Uchihashi et al. "Summarizing Video Using a Shot Importance Measure and a Frame-Packing Algorithm," Proceedings of the International Conference on Acoustics, Speech, and Signal Processing (Phoenix, AZ) 6:3041-3044 (1999).

Uchihashi et al. "Video Manga: Generating Semantically Meaningful Video Summaries," *ACM Multimedia* 99, Orlando, Florida, Oct. 30-Nov. 5, 1999.

Van Horn-Christopher, "Have you talked to your computer today?," *Business Forum*, 19(3):10-11 (1994).

Video content management and publishing software from Virage http:/www.virage.com (2002).

"Video Mail Retrieval Using Voice" Cambridge University Engineering Department Computer Laboratory and Olivetti Research Laboratory summary of research found at http://svr-www.eng.cam.ac.uk/research/projects/vmr/(1997).

"VNR firm offers Storyboards" PR News, Dec. 4, 1995, downloaded from http://proquest.umi.com/pqdlink?index=20&did=000000010830394&SrchMode=3&sid=1&F on Aug. 9, 2004.

"WC3 issues first public draft of Synchronized Multimedia Integration Language (SMIL)," *Information Today*, 15(2):27 (1998) downloaded on May 28, 2004.

Wactlar et al. "Complementary Video and Audio Analysis for Broadcast News Archives," Communications of the ACM, 43:42-47 (2000).

Wactler et al. "Intelligent access to digital video: Informedia project," Computer 29:46-52 (1996).

Weiss et aI. "Composition and Search with a Video Algebra," IEEE Multimedia 2:12-25 (1995).

Wittenburg et al."Browsing with Dynamic Key Frame Collages in Web-Based Entertainment Video Services," In Proceedings of IEEE International Conference on Multimedia Computing and Systems, Jun. 7-11, 1999, Florence, Italy 2:913-918 (1999).

"c:\...\9149920c.wpd—unmodified" Screen Shots of document created in Corel WordPerfect, 4 pages, (Apr. 30, 2002).

Product Brochure, YesVideo, downloaded from http://www.yesvideo.com/code on Mar. 15, 2005 (20 pages).

Zhang et al. "Detection of text Captions in Compressed domain Video," International Multimedia Conference Proceedings of the 2000 ACM workshops on Multimedia 2000, Los Angeles, California, United States pp. 201-204.

U.S. Appl. No. 11/636,391, filed Dec. 7, 2006, Hull.

"About Telus investors glossary," pp. 1-7 downloaded from http://about.telus.com/investors/glossary.html on Apr. 14, 2005.

Choi et al., "An Integrated Data Model and a Query Language for Content-Based Retrieval of Video," *MIS '98 LNCS 1508*, Springer Verlag Berlin Heidelberg, pp. 192-198 (1998).

"Computer Terms," pp. 1-8 downloaded from http:www.parkmeadow.org/computer_terms.htm on Apr. 14, 2005.

"Glossary for computer hardware and micro scope," pp. 1-11 downloaded from http://www.mumbaicyber.com/glossary_com_hardware_micro.asp on Apr. 14, 2005.

"Glossary: What Does It Mean?," pp. 1-3 downloaded from http://www.fairfield.k12.ct.us/fairfieldhs/cfairfieldhs03/glossary.htm on Apr. 14, 2005.

"IT&T Talk", pp. 1-4 dopwnloaded from http://www.iib.qld.gov.au/itcareers/talk.asp on Apr. 14, 2005.

Lamming et al., "Using Automatically Generated Descriptions of Human Activity to Index Multi-Media Data," IEEE Multimedia Communications and Applications IEE Colloquium, Feb. 7, 1991, abstract and pp. 5/1-5/2.

"Multimedia" pp. 1-2 downloaded from http://en.wikipedia.org/wiki/Multimedia on Apr. 14, 2005.

Ohmori, Y., "A Tool for Programmable Access to Organized Multimedia Data—Enhanced MultiMedia Recorder (EMMR)," *Joho Shori Gakkai Kenkyu Hokoku*, 98(35[HI-78]):39-44 (1998).

Phillips, R. L., "MediaView: A General Multimedia Digital Publication System," *Communications of the ACM*, 34(7):75-83 (1991).

Roschelle et al., "VideoNoter: A productivity too for video data analysis," *Behavior Research Methods, Instruments & Computers*, 23(2):219-224 (1991).

Saur et al., "Automated Analysis and Annotation of Basketball Video," *SPIE*, 3022:176-187 (1997).

Web pages from PaperClick.com printed from http://www.paperclick.com on Jun. 14, 2006, 10 pages.

Non-Final Office Action for U.S. Appl. No. 10/645,821, mailed on Mar. 9, 2007, 49 pages.

Non-Final Office Action for U.S. Appl. No. 10/645,821, mailed on Jan. 23, 2008, 23 pages.

Non-Final Office Action for U.S. Appl. No. 10/645,821, mailed on Aug. 11, 2008, 19 pages.

Final Office Action for U.S. Appl. No. 10/645,821, mailed on Feb. 5, 2009, 19 pages.

Non-Final Office Action for U.S. Appl. No. 10/645,821, mailed on Oct. 1, 2009, 17 pages.

Non-Final Office Action for U.S. Appl. No. 10/001,894, mailed on Oct. 6, 2004, 47 pages.

Final Office Action for U.S. Appl. No. 10/001,894, mailed on Apr. 21, 2005, 42 pages.

Final Office Action for U.S. Appl. No. 10/001,894, mailed on Jul. 13, 2005, 41 pages.

Non-Final Office Action for U.S. Appl. No. 10/001,894, mailed on Dec. 20, 2005, 43 pages.

Final Office Action for U.S. Appl. No. 10/001,894, mailed on Jul. 3, 2006, 11 pages.

Notice of Allowance for U.S. Appl. No. 10/001,894, mailed on Oct. 16, 2006, 6 pages.

Non-Final Office Action for U.S. Appl. No. 10/001,849, mailed on Jul. 13, 2004, 26 pages.

Notice of Allowance for U.S. Appl. No. 10/001,849, mailed on Apr. 19, 2005, 12 pages.

Non-Final Office Action for U.S. Appl. No. 10/001,849, mailed on Jul. 13, 2005, 13 pages.

Final Office Action for U.S. Appl. No. 10/001,849, mailed on Mar. 23, 2006, 16 pages.

Non-Final Office Action for U.S. Appl. No. 10/001,849, mailed on Sep. 20, 2006, 12 pages.

Notice of Allowance for U.S. Appl. No. 10/001,849, mailed on May 3, 2007, 9 pages.

Non-Final Office Action for U.S. Appl. No. 10/001,891, mailed on Sep. 7, 2005, 30 pages.

Final Office Action for U.S. Appl. No. 10/001,891, mailed on Mar. 29, 2006, 25 pages.

Non-Final Office Action for U.S. Appl. No. 10/001,891, mailed on Nov. 14, 2006, 14 pages.

Final Office Action for U.S. Appl. No. 10/001,891, mailed on May 30, 2007, 14 pages.

Final Office Action for U.S. Appl. No. 10/001,891, mailed on Jan. 25, 2008, 15 pages.

Non-Final Office Action for U.S. Appl. No. 10/001,891, mailed on Feb. 5, 2009, 13 pages.

Non-Final Office Action for U.S. Appl. No. 10/001,891, mailed on Aug. 5, 2009, 11 pages.

Non-Final Office Action for U.S. Appl. No. 10/001,893, mailed on Aug. 27, 2004, 20 pages.

Notice of Allowance for U.S. Appl. No. 10/001,893, mailed Apr. 19, 2005, 12 pages.

Non-Final Office Action for U.S. Appl. No. 10/001,893, mailed on Jul. 13, 2005, 11 pages.

Final Office Action for U.S. Appl. No. 10/001,893, mailed on Mar. 21, 2006, 13 pages.

Non-Final Office Action for U.S. Appl. No. 10/001,893, mailed on Sep. 20, 2006, 13 pages.

Notice of Allowance for U.S. Appl. No. 10/001,893, mailed on May 3, 2007, 4 pages.

Non-Final Office Action for U.S. Appl. No. 11/021,303, mailed on Apr. 8, 2008, 16 pages.

Final Office Action for U.S. Appl. No. 11/021,303, mailed on Nov. 28, 2008, 10 pages.

Non-Final Office Action for U.S. Appl. No. 11/021,303, mailed on Jun. 8, 2009, 9 pages.

Final Office Action for U.S. Appl. No. 10/001,891, mailed on Jan. 21, 2010, 16 pages.

Final Office Action for U.S. Appl. No. 11/021,303, mailed on Nov. 18, 2009, 10 pages.

Photina et al. "Improving acoustic models with captioned multimedia speech," Proceedings IEEE International Conference on Multimedia Computing and Systems, 2:767-71 (1999).

Shahraray et al. "Automatic generation of pictorial transcripts of video programs," Proceedings of the SPIE- Int. Soc. Opt. Eng. 2417:512-518 (1995).

* cited by examiner

 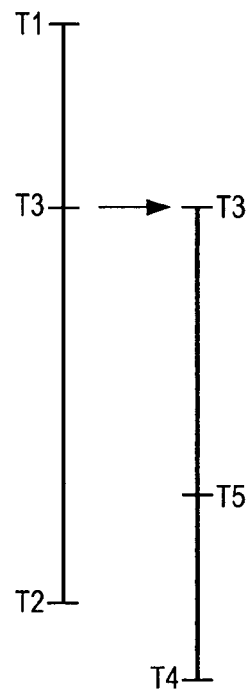 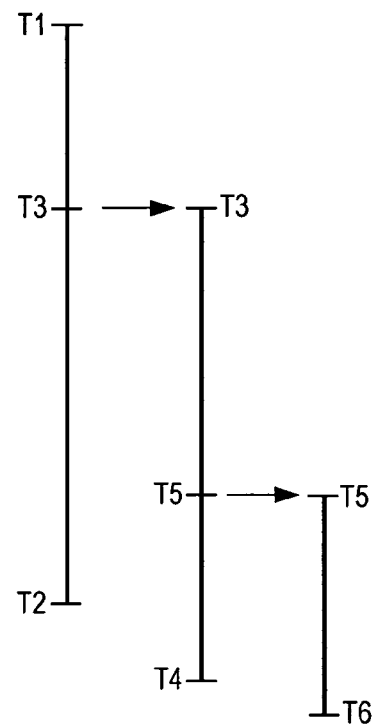
*FIG. 6A*   *FIG. 6B*   *FIG. 6C*

PAPER INTERFACE FOR SIMULATION ENVIRONMENTS

CROSS-REFERENCES TO RELATED APPLICATIONS

The present application claims priority from and is a continuation-in-part (CIP) application of the following applications, the entire contents of which are incorporated herein by reference for all purposes:
(1) U.S. application Ser. No. 10/001,895, "PAPER-BASED INTERFACE FOR MULTIMEDIA INFORMATION", filed Nov. 19, 2001;
(2) U.S. application Ser. No. 10/001,894, "TECHNIQUES FOR RETRIEVING MULTIMEDIA INFORMATION USING A PAPER-BASED INTERFACE", filed Nov. 19, 2001;
(3) U.S. application Ser. No. 10/001,849, "TECHNIQUES FOR ANNOTATING MULTIMEDIA INFORMATION", filed Nov. 19, 2001;
(4) U.S. application Ser. No. 10/001,891, "PAPER-BASED INTERFACE FOR MULTIMEDIA INFORMATION STORED BY MULTIPLE MULTIMEDIA DOCUMENTS", filed Nov. 19, 2001;
(5) U.S. application Ser. No. 10/001,893, "TECHNIQUES FOR GENERATING A COVERSHEET FOR A PAPER-BASED INTERFACE FOR MULTIMEDIA INFORMATION", filed Nov. 19, 2001;
(6) U.S. application Ser. No. 10/175,540, "DEVICE FOR GENERATING A MULTIMEDIA PAPER DOCUMENT", filed Jun. 18, 2002;
(7) U.S. application Ser. No. 10/645,821, "PAPER-BASED INTERFACE FOR SPECIFYING RANGES", filed Aug. 20, 2003;
(8) U.S. application Ser. No. 11/021,303, "TECHNIQUES FOR GENERATING A STATIC REPRESENTATION FOR TIME-BASED MEDIA INFORMATION" filed Dec. 23, 2004;
(9) U.S. patent application Ser. No. 10/081,129, entitled "Multimedia Visualization and Integration Environment," filed on Feb. 21, 2002;
(10) U.S. patent application Ser. No. 10/174,522, entitled "Television-Based Visualization and Navigation Interface," filed on Jun. 17, 2002;
(11) U.S. patent application Ser. No. 10/465,022, entitled "Techniques For Displaying Information Stored In Multiple Multimedia Documents," filed on Jun. 18, 2003 which in turn is a non-provisional of U.S. Provisional Application No. 60/434,314 filed Dec. 17, 2002 (the entire contents of the provisional application are incorporated herein by reference for all purposes);
(12) U.S. patent application Ser. No. 10/465,027 entitled "Interface For Printing Multimedia Information," filed on Jun. 18, 2003 which in turn is a non-provisional of U.S. Provisional Application No. 60/434,314 filed Dec. 17, 2002 (the entire contents of the provisional application are incorporated herein by reference for all purposes);
(13) U.S. patent application Ser. No. 10/701,966 entitled "Multimedia Visualization and Integration Environment," filed on Nov. 4, 2003;
(14) U.S. patent application Ser. No. 10/795,031 entitled "Multimedia Visualization and Integration Environment," filed Mar. 3, 2004;
(15) U.S. application Ser. No. 10/814,944, "Multimedia Print Driver Dialog Interfaces", filed Mar. 30, 2004. This application in turn claims priority from the following provisional patent applications, which are incorporated herein by reference in their entirety for all purposes: (i) U.S. Provisional Patent Application No. 60/506,303 entitled "Printer Including One or More Specialized Hardware Devices" filed on Sep. 25, 2003; and (ii) U.S. Provisional Patent Application No. 60/506,206 entitled "Printer Driver, Interface and Method for Selecting and Printing Representations of Audio, Video or Processed Information" filed on Sep. 25, 2003; and
(16) U.S. application Ser. No. 10/814,844, "Printable Representation for Time-based Media", filed Mar. 30, 2004. This application in turn claims priority from the following provisional patent applications, which are incorporated herein by reference in their entirety for all purposes: (i) U.S. Provisional Patent Application No. 60/506,303 entitled "Printer Including One or More Specialized Hardware Devices" filed on Sep. 25, 2003; (ii) U.S. Provisional Patent Application No. 60/506,411 entitled "Printer For Non-Paper and Multiple Media Types" filed on Sep. 25, 2003; and (iii) U.S. Provisional Patent Application No. 60/506,263 entitled "Systems and Methods for Printing Audio or Video Paper" filed on Sep. 25, 2003.

The present application is also related to the following co-pending patent applications, each of which is hereby incorporated by reference in its entirety for all purposes:

U.S. patent application Ser. No. 10/814,931 entitled, "Printer Having Embedded Functionality for Printing Time-Based Media," to Hart et al., filed Mar. 30, 2004;

U.S. patent application Ser. No. 10/814,846 entitled, "Printer With Hardware and Software Interfaces for Peripheral Devices," to Hart et al., filed Mar. 30, 2004;

U.S. patent application Ser. No. 10/814,700 entitled, "Printer User Interface," to Hart et al., filed Mar. 30, 2004;

U.S. patent application Ser. No. 10/814,500 entitled, "User Interface for Networked Printer," to Hart et al., filed Mar. 30, 2004;

U.S. patent application Ser. No. 10/814,845 entitled, "Stand Alone Multimedia Printer With User Interface for Allocating Processing," to Hart et al., filed Mar. 30, 2004;

U.S. patent application Ser. No. 10/814,948 entitled "Networked Printing System Having Embedded Functionality for Printing Time-Based Media," to Hart, et al., filed Mar. 30, 2004;

U.S. patent application Ser. No. 10/814,844 entitled "Printable Representations for Time-Based Media," to Hull, et. al., filed on Mar. 30, 2004; and U.S. patent application Ser. No. 10/813,950 entitled "Printing System with Embedded Audio/Video Content Recognition and Processing," to Hull et al., filed on Mar. 30, 2004.

BACKGROUND OF THE INVENTION

The present invention relates to simulation environments, and more particularly to techniques that provide a paper interface for replaying time-based media information generated by a simulation and/or restarting execution of a simulation program.

Simulators or simulation applications/programs are used in various fields for a variety of applications. For example in the medical field, simulators are commonly used for virtual surgeries and for training doctors. In the defense field, simulators such as flight simulators, troop movement simulators, scenario simulators, etc. are used to train personnel such as pilots, tank commanders, etc. Flight simulators are also being used in the aviation field for training pilots. Simulators are also used for other applications.

Simulation programs in the form of video games are becoming very popular in the consumer entertainment industry. The video gaming industry has enjoyed great success over the past few years. It is estimated that total video game sales topped $10 billion in 2003. The age group of video game players has also widened significantly over the last few years. In addition to male game players, the last few years have seen a dramatic increase in the number of female participants. The video gaming industry is thus expected to see continued explosive growth.

Due to the ever increasing use of simulators in different application domains, techniques that provide different ways of using simulators and accessing information generated by the simulations are desirable.

BRIEF SUMMARY OF THE INVENTION

Embodiments of the present invention provide techniques for using a paper interface to replay time-based media information generated by a simulation and/or restart execution of a simulation program.

According to an embodiment of the present invention, a static representation is generated for time-based media information captured during execution of a simulation. The static representation may be printed on a paper medium. The paper medium on which the static representation is printed may be used to perform various operations such as replaying previously recorded time-based media information for a simulation from a user-selectable time point. The paper medium on which the static representation is printed may also be used to restart execution of a simulation program from a user-selectable time point during a previous run of the simulation program.

According to an embodiment of the present invention, techniques are provided for initiating execution of a simulation program. Information is received identifying a first tag read from a paper document. A first time point is determined corresponding to the first tag. From state information stored for the simulation program, first state information is determined for the first time point. Execution of the simulation program is initiated from the first time point using the first state information.

According to another embodiment of the present invention, techniques are provided for replaying information. Information is received identifying a first tag read from a paper document. A first time point is determined corresponding to the first tag. Based upon the first time point, a portion of time-based media information recorded for a simulation program is determined. Replay of the portion of the time-based media information is initiated using an output device.

According to another embodiment of the present invention, techniques are provided for performing an operation based upon information read from a paper document. Information is received identifying a first tag read from a paper document. A first time point corresponding to the first tag is determined. A present mode is determined. If the present mode is determined to be a first mode, then from state information stored for the simulation program, first state information is determined for the first time point, and execution of the simulation program is initiated from the first time point using the first state information. If the present mode is determined to be a second mode, then based upon the first time point, a portion of time-based media information recorded for the simulation program is determined and the portion of the time-based media information is replayed.

The foregoing, together with other features, embodiments, and advantages of the present invention, will become more apparent when referring to the following specification, claims, and accompanying drawings.

BRIEF DESCRIPTION OF THE DRAWINGS

FIGS. 6A, 6B, and 6C depict various execution paths that may result from restarting a game from different time points according to an embodiment of the present invention;

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for using a paper interface to replay (or playback) time-based media information generated by a simulation and/or restart the execution of a simulation program. According to an embodiment of the present invention, a static representation is generated for time-based media information that is generated and captured during the execution of a simulation program. The static representation may be printed on a paper medium. The paper medium on which the static representation is printed may be used to perform various operations such as replaying (i.e., playing back) previously recorded time-based media information for a simulation from a user-selectable time point. The paper medium on which the static representation is printed may also be used to restart the execution of a simulation program from a user-selectable time point. Various other operations may also be performed using the paper medium.

A simulation is the result of running or executing a simulation program. Examples of simulation programs include flight simulation programs, programs that simulate virtual surgery, video games, and the like.

Figure 1:
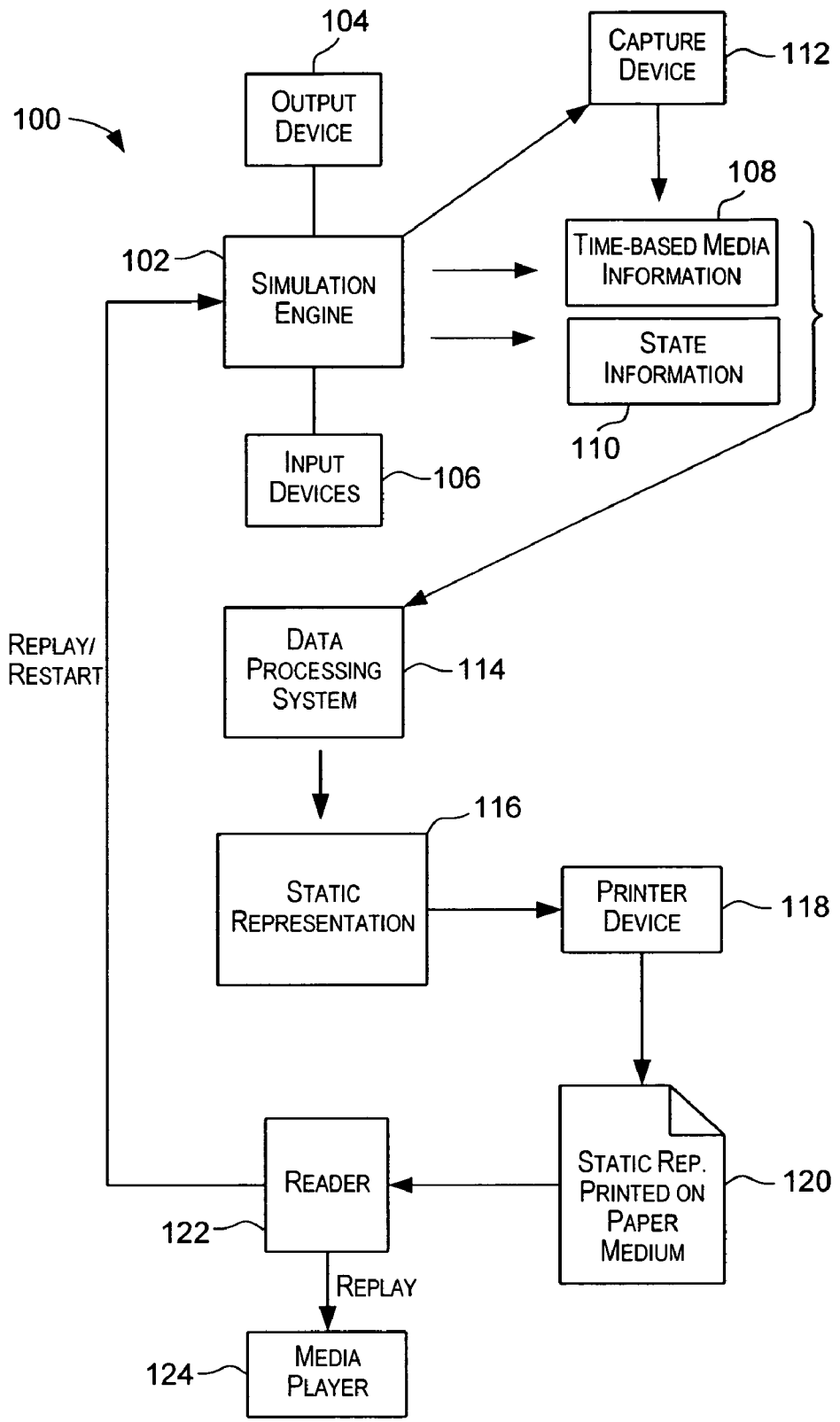
FIG. 1 is a simplified block diagram of a system that may incorporate an embodiment of the present invention.

FIG. 1 is a simplified block diagram of a system that may incorporate an embodiment of the present invention. FIG. 1 is merely illustrative of an embodiment incorporating the present invention and does not limit the scope of the invention as recited in the claims. One of ordinary skill in the art would recognize other variations, modifications, and alternatives.

System 100 comprises a simulation engine 102 that is configured to execute a simulation program. A simulation refers to the execution of the simulation program by simulation engine 102. Simulation engine 102 may be embodied in various forms. Simulation engine 102 may be implemented in software, or hardware, or combinations thereof. For example, for video games, simulation engine 102 may be a game console such as those provided by companies like Sony™, Sega™, Nintendo™, Microsoft™, etc. Simulation engine 102 may be configured to receive a game cartridge or an optical disk storing the simulation program and to execute the simulation program. Simulation engine 102 may also be a data processing system such as a personal computer, and the like. For example, a data processing system may be configured to execute a simulation program (e.g., a video game, a flight simulator program, etc.). In some embodiments, simulation engine 102 may also be implemented as software modules (code or instructions) that are executed by a data processing system and facilitate running of a simulation.

The output of executing the simulation program may be displayed to a user via one or more output devices 104. Output device 104 may be a monitor (e.g., computer monitor, TV monitor), an audio output device, etc. One or more input devices 106 may be coupled with simulation engine 102. The connection between an input device 106 and simulation engine 102 may be wired or wireless. Input devices 106 enable a user to interact with a simulation executed by simulation engine 102. For example, during a game, a player may use an input device to move a character in a game. Examples of input devices 106 include keyboards, mouse controllers, joysticks, specialized controllers, motion sensors, audio capture devices, and the like.

The execution of a simulation program (i.e., a simulation) may generate different types of information. The information that is generated may include time-based media information 108 and state information 110. Time-based media information refers to information that has a temporal component associated with it. Time-based media information generally includes information that is captured or recorded over a period of time. Time-based media information is generally characterized by a start time and an end time. The time period between the start time and end time represents the time duration of the time-based media information. Time-based media information may comprise information of one or more types (or streams) such as audio stream information, video stream information, animation information, etc. or combinations thereof. Time-based media information may include one or more channels, where each channel represents information of a particular type. Multimedia information is an example of time-based media information. Multimedia information may refer to any one of or a combination of text information, graphics information, animation information, audio information, video information, images (e.g., slides, whiteboard images,), etc. Various formats may be used to store the multimedia information such as various MPEG formats (e.g., MPEG 1, MPEG 2, MPEG 3, MPEG 4, MPEG 7, etc.), MP3 format, Synchronized Multimedia Integration Language (SMIL) format, HTML+TIME format, WMF (Windows Media Format), RM (Real Media) format, Quicktime format, Shockwave format, various image formats (e.g., JPEG, etc.), various streaming media formats, formats being developed by the engineering community, proprietary and customized formats, and others. Time-based media information may comprise media objects of different types such as an audio media object, video media object, etc. The media objects may comprise information one or more types.

In addition to time-based media information, state information may also be generated during the execution of a simulation program. The state information may comprise information that references the time-based media information and may be used to recreate the simulation. For example, state information generated during the execution of a car racing video game may include information such as the type of car used in the simulation, the state of the car (e.g., fuel level, damage level) selected by a player for racing, the racetrack used in the simulation, the path taken by the player's car along the racetrack, penalties earned by the player, etc. State information 110 may be temporally synchronized with time-based media information 108.

According to an embodiment of the present invention, simulation engine 102 is configured to capture and store time-based media information 108 that is generated by the execution of a simulation program. For example, simulation engine 102 may be configured to store the audio and video information generated by the execution of a video game. The video and audio information may be recorded as separate channels of the time-based media information. Different formats may be used for storing the time-based media information. The time-based media information that is generated and stored may include information of one or more types. The types of information included in time-based media information that is generated for a simulation program may depend upon the type of simulation program.

In addition to capturing time-based media information 108 for a simulation, simulation engine 102 may also be configured to capture state information 110 generated during the simulation. Simulation engine 102 may be configured to capture the state information as the simulation progresses. The state information 110 may be temporally synchronized with captured time-based media information 108.

In one embodiment, time-based media information 108 may be subdivided into units and state information 110 is captured for each unit of time-based media information 108. A unit can vary in its representation. For example, a unit may be one video frame captured every ⅟₃₀ of a second (which amounts to the standard 30 fps video recording rate). In this embodiment, for each video frame, state information 110 may comprise a unit of information storing simulation-related application state information for the video frame. The state information that is captured for each unit may vary depending upon the nature of the simulation. The format used for storing the state information may also vary. Various formats may be used such as text, XML, etc.

In some embodiments, time-based media information 108 and/or state information 110 may be recorded and stored by capture device 112 instead of (or in conjunction with) simulation engine 102. In such an embodiment, capture device 112 may be configured to tap (or receive) the time-based media information output and the state information output of simulation engine 102 and store time-based media information 108 and state information 110. The time-based media information and the state information may be captured while the simulation program is executing (i.e., as the simulation is progressing). For example, a video signal from a simulation engine 102 executing a video game may be piped to a video capture device while playing the game. Simulation engine 102 may include a video card (e.g., video cards from ATI™) that allows the output of the video card to be sent to both a monitor (e.g., output device 104) and a video capture system such as a VCR. The video input signal may be digitized during game play by recording the video to a storage medium (e.g., a VHS tape). As a result, a MPEG2 file may be stored capturing the video information from the simulation.

A data processing system 114 may be configured to access time-based media information 108 for an executed simulation and generate a static representation 116 for the time-based media information. Static representation 116 is such that it can be printed on a paper medium. Static representation 116 is intended to provide a visual representation of the time-based media information 108 or a portion thereof captured for a simulation.

The contents of static representation 116 may vary depending on the types of information included in the time-based media information 108 for which the static representation is generated. For example, if time-based media information 108 comprises video information, then a static representation 116 for the video information may comprise one or more keyframes extracted from the video information. If time-based media information 108 comprises audio information, then a static representation 116 of the audio information may comprise a transcription (or closed-caption text equivalent) of the audio information. If time-based media information 108 comprises different types of information (e.g., audio, video, etc.), static representation 116 may comprise visual static representations generated for the various types of information. Techniques for generating various types of static representations are described in the various U.S. patent applications incorporated by reference in this application. Static representation 116 may be generated in various forms such as PDF, JPEG, and the like.

According to an embodiment of the present invention, static representation 116 may comprise a timeline representing the duration of the simulation. Occurrences of one or more events that occur in the time-based media information may be visually indicated along the timeline. An event (or feature) may be related to some aspect of the contents of the time-based media information or related to some other attribute of the time-based media information. For example, for time-based media information generated by execution of a video game, events may correspond to instances when a user picks up health packs in the game, kills a monster, uses a particular weapon, etc. Information identifying which events are to be included in the static representation may be provided to data processing system 114. Alternatively, data processing system 114 may be configured to automatically analyze the time-based media information captured for a simulation and detect occurrences of one or more predefined events. Description related to generating a static representation 116 comprising a timeline with events mapped to the timeline is provided in U.S. application Ser. No. 11/021,303 filed Dec. 23, 2004, the entire contents of which are incorporated herein by reference for all purposes.

Static representation 116 may also comprise various types of tags. The tags may include one or more tags that correspond to or encode specific time points. As described below in further detail, these time encoding tags (or time tags) may be used to initiate replay of the recorded time-based media information from a time corresponding to the time tag. The time tags may also be used to restart execution of the simulation program from a time point corresponding to the tag.

Static representation 116 may also comprise tags that may be used to perform other actions. For example, one or more tags (action tags) may be provided to activate a particular mode, e.g., a replay mode or a restart mode, or to toggle between modes.

Various different techniques may be used to implement the tags. In the embodiments described below, barcodes are used to implement tags. The barcodes may be read by devices such as barcode readers that are configured to initiate playback or replay or initiate other actions corresponding to the tags.

Static representation 116 may be communicated to a printer device 118 (e.g., a printer, a copier, a multi-function device, etc.) that is configured to print the static representation on a paper medium to generate a paper document 120. Paper document 120 may comprise one or more pages with static representation 116 printed on the pages. The term paper or paper medium is intended to refer to any physical medium on which information can be printed, written, drawn, imprinted, embossed, etc.

Paper document 120 may be used for a variety of purposes. In one embodiment, paper document 120 may be used to replay a portion of the recorded time-based media information 108 recorded for a previously executed simulation. Replaying a portion of the recorded time-based media information causes playback of the portion of the time-based media information. For example, a user may scan a tag printed on paper document 120 using a reader device 122 to activate "replay" mode (if not already in replay mode). The user may then scan a tag representing or encoding a time point using reader device 122 to cause replay or playback of the time-based media information 108 recorded for the simulation from a time corresponding to the scanned time tag. The replay may be output on output device 104 or some other output device. In one embodiment, a media player 124 (or some other application) may be invoked responsive to selection of the time tag and media player 124 may be used to replay a portion of previously recorded time-based media information 108.

Most simulation engines allow a user to replay a previously executed simulation. For example, a user may play a video game (e.g., a car race) and then replay the race. The replay enables a user to see the moves that the user made during the game. The user may then use information gleaned from the replay to improve the user's skills during a subsequent execution of the game. Replay modes in simulation applications thus allow users to learn from and build upon the user's previous experiences in the simulation. Embodiments of the present invention enable such replays to be initiated using a paper interface.

Paper document 120 may also be used to restart the execution of a simulation program. As a result of the restart, execution of a simulation program is restarted from any time point defined by a previous execution of the simulation program (i.e., from any time point during a previous simulation). The re-executed simulation program then follows a new execution path from the restart time point. The starting state of the restarted simulation (i.e., the state of the restarted simulation at the starting time point) is substantially the same as the state at the corresponding time point (i.e., the time point used for the restart) during a previous simulation.

Several previous execution paths (or simulations) may exist for a particular simulation program. For example, several different previously executed paths may exist for a video game. The time point and the specific previous simulation to be used for the restart may be user-selectable. In some embodiments, the most recent execution path may be automatically selected for restart.

In one embodiment, in order to restart execution of a simulation program from a particular time point using paper document 120, the user may scan an action tag printed on paper document 120 using a reader device 122 to activate "restart" mode (if not already in restart mode). The user may then scan a tag representing or encoding a time point using reader device 122. Responsive to scanning of the time tag, information identifying the time corresponding to the scanned tag is communicated to simulation engine 102. Simulation engine 102 then selects the most simulation (or a user-specified simulation) and determines state information 110 for the previously executed simulation up until the time point corresponding to the scanned tag. Simulation engine 102 then restarts execution of the simulation program from the time point using the determined state information.

For example, during a previous execution of a car racing video game, the player may come across a fork in the racetrack and may have selected the left fork to continue the race. The player may later restart the video game from a time point where the fork was shown, and during the newly restarted execution of the video game the player may select the right fork to continue the race.

Figure 2:
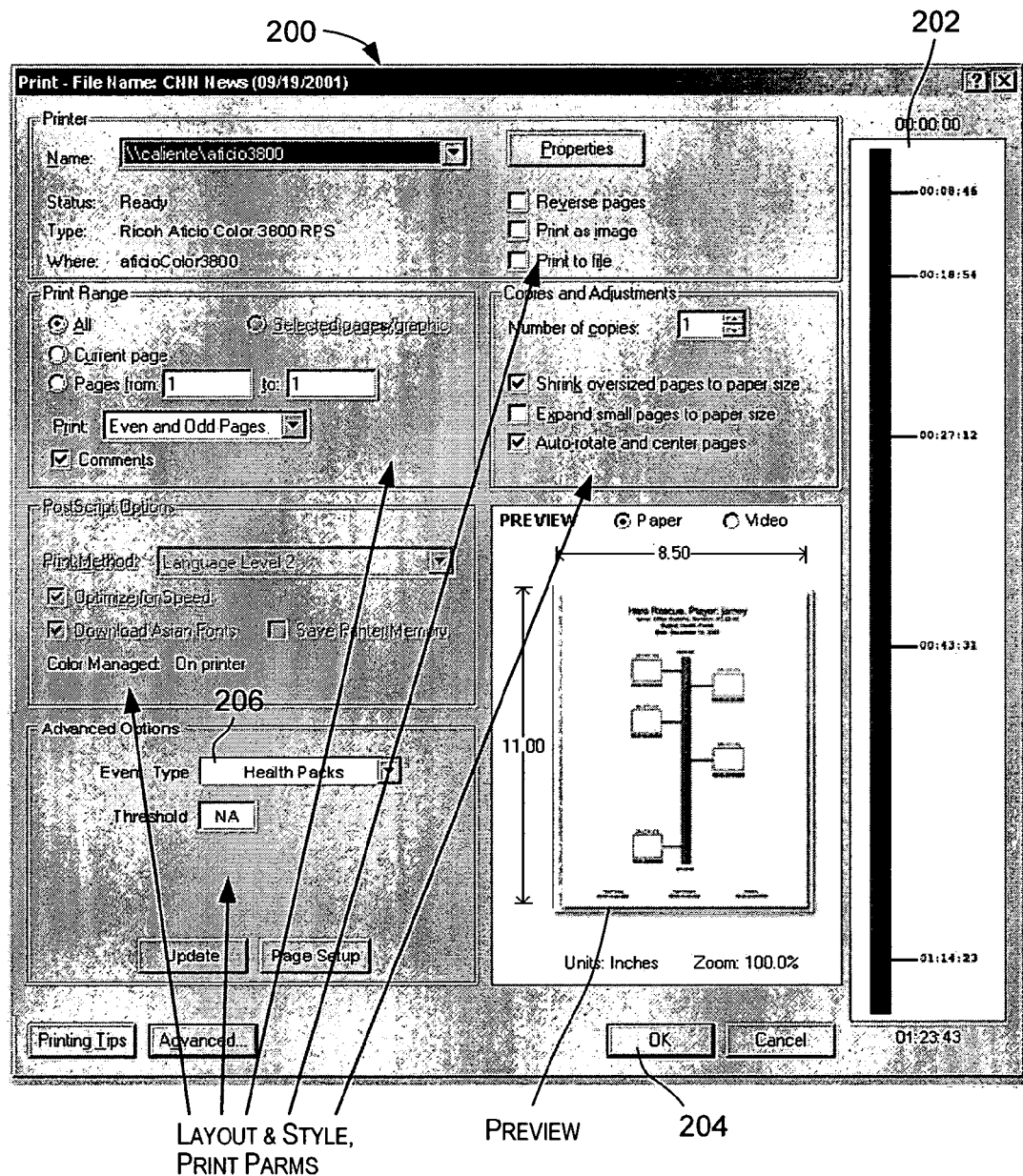
FIG. 2 depicts a print dialog box that may be used to generate a static representation for a simulation and print the static representation on a paper medium according to an embodiment of the present invention.

As described above, a static representation may be generated for time-based media information recorded for a simulation. The static representation may be printed on a paper document and the paper document used to replay or restart the simulation. FIG. 2 depicts a print dialog box 200 that may be used to generate a static representation for a simulation and print the static representation on a paper medium according to an embodiment of the present invention. Print dialog box 200 depicted in FIG. 2 is merely illustrative of an embodiment of the present invention and is not intended to limit the scope of the present invention. Other variations, modifications, and alternatives are also within the scope of the present invention.

Print dialog box 200 allows a user to select a portion or portions of the recorded time-based media information captured for a simulation for which a static representation is to be generated and printed on a paper medium. For example, as depicted in FIG. 2, print dialog box 200 comprises a thumbar timeline 202 that provides a visual representation of the recorded time-based media information for a simulation. Timeline 202 may be generated based upon content extracted from the recorded time-based media information and gives the user a context of the recorded information. Timeline 202 in FIG. 2 depicts times along the timeline when certain events occur in the recorded information. The events to be depicted may be selected from menu 206. As depicted in FIG. 2, the "Health Packs" events type (i.e., instances in the recorded information when health packs were picked up) has been selected.

The user may use timeline 202 to identify one or more portions of the time-based media information for which a static representation is to be generated. The user may select the entire time-based media information for generation of the static representation. The user may also select a portion of the time-based media information for generation of the static representation. In one embodiment, the portion may be specified by specifying a segment of time characterized by a start time (which may be different from the start of the time-based media information recording for the simulation) and an end time (which may be different from the end of the time-based media information recording for the simulation) and the static representation is generated for time-based media information corresponding to the specified time segment between the start time and the end time.

A user may also specify multiple possibly non-contiguous time segments, each characterized by a start time and an end time for generation of the static representation. A static representation is generated for the user-specified time segments using the time-based media information recorded for the time segments. Various user interfaces may be provided for selecting portions of the time-based media information for which a static representation is to be generated and printed.

Print dialog box 200 also enables the user to specify various layout and style and print parameters to be used for the generation and printing of the static representation. A print preview of the static representation is also provided based upon the information configured by the user. Selection of "OK" button 204 causes the static representation to be generated for portions of the time-based media information specified by the user and the static representation to be printed on a paper medium to generate a paper document comprising one or more pages on which the static representation is printed.

As previously indicated, in one embodiment, the static representation that is generated may comprise a timeline representing the duration of the simulation. Occurrences of one or more events that occur in the time-based media information may be visually indicated along the timeline. A user may provide information identifying the types of events to be included in the static representation. In FIG. 2, this information may be provided using the "Advanced Options" section of dialog box 200. Under the "Segmentation Type" selection, the user may specify the type of events to be included in the static representation. Sections of the time-based media information when the specified event occurs may be highlighted in thumbar 202.

Further details related to print dialog box 200 and techniques for printing the static representation on a paper medium are described in the various applications incorporated herein by reference. For example, U.S. application Ser. No. 10/814,944, "Multimedia Print Driver Dialog Interfaces", filed Mar. 30, 2004 describes various print dialog interfaces.

Figure 3:
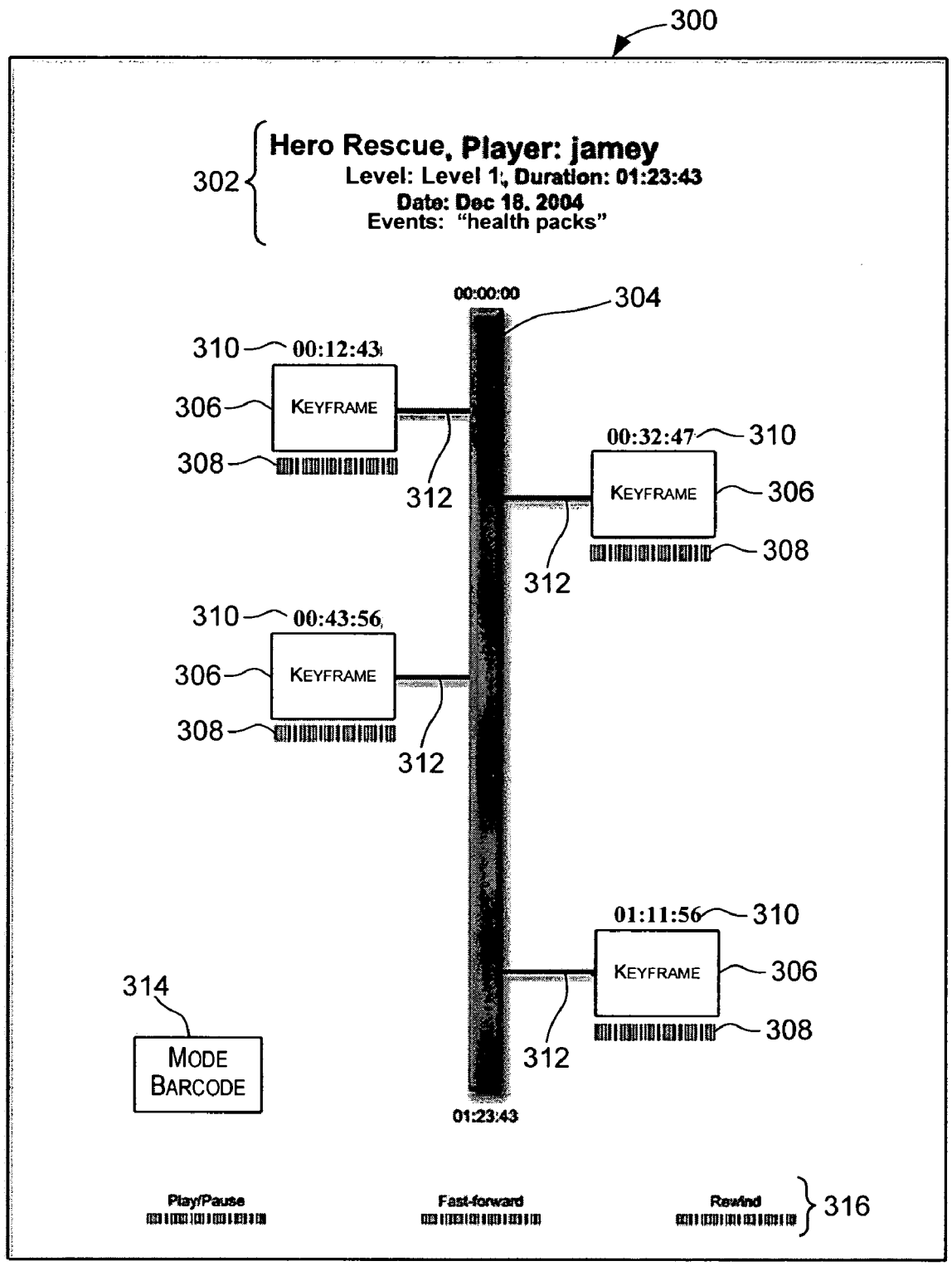
FIG. 3 depicts a page from a paper document generated by printing a static representation for time-based media information recorded for a simulation on a paper medium according to an embodiment of the present invention.

FIG. 3 depicts a page from a paper document generated by printing a static representation for time-based media information recorded for a simulation on a paper medium according to an embodiment of the present invention. Page 300 depicted in FIG. 3 is merely illustrative of an embodiment of the present invention and is not intended to limit the scope of the present invention as recited in the claims. Other variations, modifications, and alternatives are also within the scope of the present invention.

Page 300 depicts a static representation generated and printed on a page 300 according to an embodiment of the present invention. The static representation depicted in FIG. 3 is generated using time-based media information captured during the execution of a video game entitled "Hero Rescue". As shown in FIG. 3, information 302 related to the game is printed at the top of page 300. Information 302 includes the name of the game, information identifying a player of the game, the level of the game, the duration of the time-based media information for which the static representation is generated, and the date on which the game was played.

Page 300 comprises a timeline 304 (laid vertically) representing the duration of the time-based media information for which the static representation was generated. The top of the timeline represents the start time (00:00:00) of the game recording and the bottom of the timeline represents the end (01:23:43) of the time period for which the static representation is generated.

Various events are mapped to the timeline 304. A visual representation 306 is provided for each event. In FIG. 3, the visual representation for each event is a keyframe extracted from the recorded video portion of the time-based media information when the event occurs. Other types of visual representations may be used to depict an event in alternative embodiments.

The user may specify the events to be detected in the time-based media information and included in the static representation. For example, a user may specify that events representing instances when "health packs" were picked up during the game are to be included in the static representation for the time-based media information. In page 300, occurrences of events when "health packs" were picked up are plotted along timeline 304. Information identifying the events ("health packs") that are depicted in the static representation is included in information 302.

A tag 308 is printed for each event. Tag 308 ("time tag") for an event represents or encodes a time during the simulation when the event approximately occurred. In FIG. 3, a barcode is used to implement each time tag. A time 310 corresponding to each tag associated with an event is also printed. For each event, a line or arrow 312 is printed showing the approximate location along timeline 304 when the event occurs in the recorded time-based media information for the simulation. Depending upon the mode of operation, a time tag 308 may be scanned by a user using a barcode reader to either restart the simulation from a time corresponding to the scanned tag or to initiate replay of previously recorded time-based media information from a time corresponding to the scanned time tag. In this manner, page 300 provides a paper-based interface for replaying or restarting the simulation.

A tag 314 ("mode tag") is also provided for activating a particular mode. If two modes are provided, namely replay mode and restart mode, mode barcode 314 may be scanned to switch between the two modes. In this scenario, scanning mode tag 314 toggles the present mode of operation. For example, if the present mode of operation is "replay" mode, then scanning mode tag 314 changes the mode to a "restart" mode, and vice versa. In alternative embodiments, more than two modes of operation may be provided. Further, multiple mode tags may be provided in alternative embodiments. A set of tags 316 is also provided for controlling the playback of the information.

The events may be detected while the game is being played. For example, simulation engine 102 may be configured to analyze the time-based media information as it is being captured during game play to determine occurrences of events. The time-based media information recorded for a game may be also be processed after the execution of the game to detect occurrences of events. The events data may then be used to generate the static representation for the time-based media information recorded for the game.

As described above, a user may specify the type of events to be detected in the time-based media information and to be included in the static representation. For example, a user interface such interface 200 depicted in FIG. 2 may be provided that allows a user to select the type of events to be included from menu 206. In other embodiments, one or more events may be automatically detected and selected for inclusion in the static representation. For example, events may be selected at periodic time intervals.

Further information related to static representations that include timelines and events mapped to the timeline is provided in U.S. application Ser. No. 11/021,303 filed Dec. 23, 2004.

Figure 4:
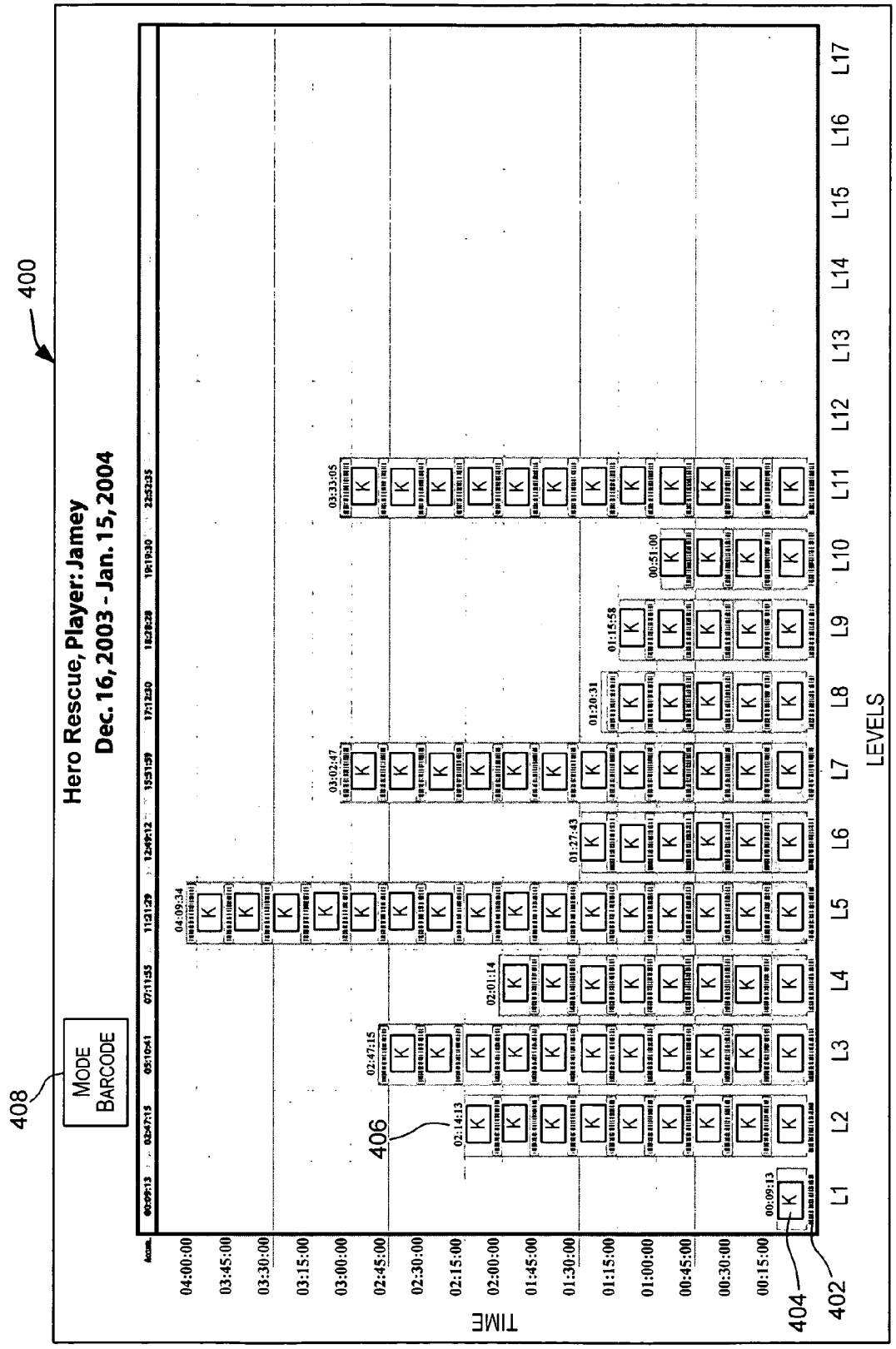
FIG. 4 depicts another paper document generated by printing a static representation for time-based media information recorded for a simulation on a paper medium according to an embodiment of the present invention.

FIG. 4 depicts another paper document 400 generated by printing a static representation for time-based media information recorded for a simulation on a paper medium according to an embodiment of the present invention. Page 400 depicted in FIG. 4 is merely illustrative of an embodiment of the present invention and is not intended to limit the scope of the present invention as recited in the claims. Other variations, modifications, and alternatives are also within the scope of the present invention.

Page 400 depicts a static representation generated for a video game "Hero Rescue". Information related to the game is printed at the top of page 400. This information includes information identifying the name of the game, information identifying a player of the game, and information identifying the period of time over which the player played the game.

As shown in FIG. 4, a two-dimensional chart is printed where the X-axis of the chart represents the game levels and the Y-axis represents the duration (time) taken by the player for each level. The game depicted in FIG. 4 comprises seventeen levels (L1 through L17). In FIG. 4, the time axis is in increments of 15 minutes. For each level, the time 406 taken by the user to complete the level is provided. Further, for each level, for each time increment along the time axis, a representative keyframe 404 (identified by letter "K" in FIG. 4) is extracted from the video information generated by game and printed on page 400 for that level. A tag 402 is printed for each keyframe. In one embodiment tag 402 encodes a time during the level when the corresponding keyframe was extracted from the video information. Depending upon the mode of operation, time tag 402 may be scanned using a barcode reader to either restart the game from a time corresponding to the scanned tag or to initiate replay of previously recorded time-based media information from a time corresponding to the scanned time tag. In this manner, page 400 provides a paper-based interface for replaying or restarting the game.

A tag 408 ("mode tag") is also provided for switching between replay mode and restart mode. Scanning mode tag 408 toggles the present mode of operation. For example, if the present mode of operation is "replay" mode, then scanning mode tag 408 changes the mode to a "restart" mode, and vice versa. In alternative embodiments, more than two modes of operation may be provided. Further, multiple mode tags may be provided in alternative embodiments.

The static representation printed on page 400 provides information related to a player's game playing experience. The static representation shows the number of levels that a player has completed and also the time taken by the player to complete each level. By glancing at such a graph, one can see which levels the player had difficulty completing. For example, in FIG. 4, player "Jamey" took the longest time to complete level five (L5). The keyframes depicted for each level also provide a context for the level. Tags 402 printed in the static representation also enable a user to either replay time-based media information recorded for the game or to restart the game from a particular time point.

Figure 5A:
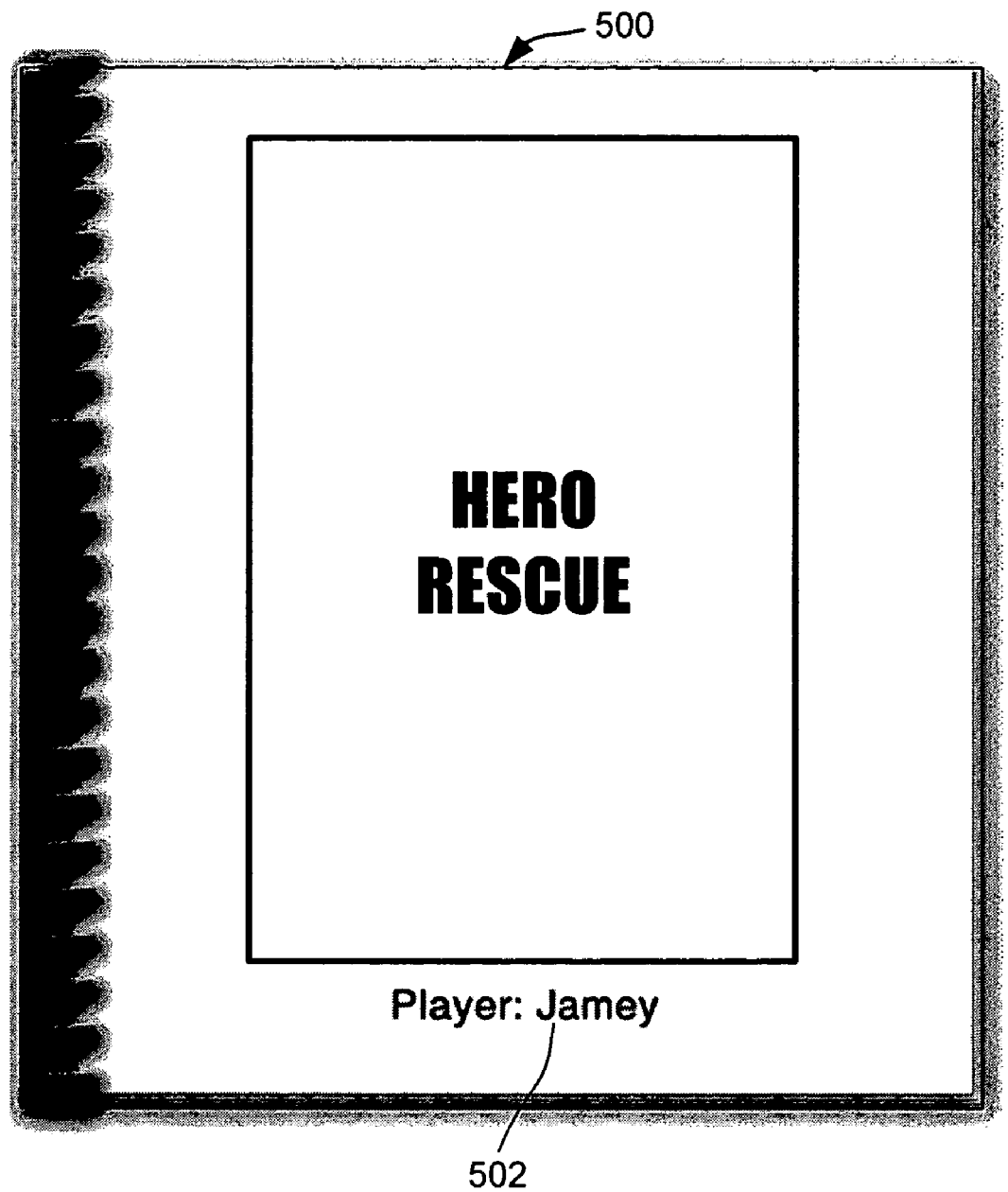
FIGS. 5A and 5B depicts another static representation that may be generated and printed on a paper medium for a simulation according to an embodiment of the present invention.
Figure 5B:
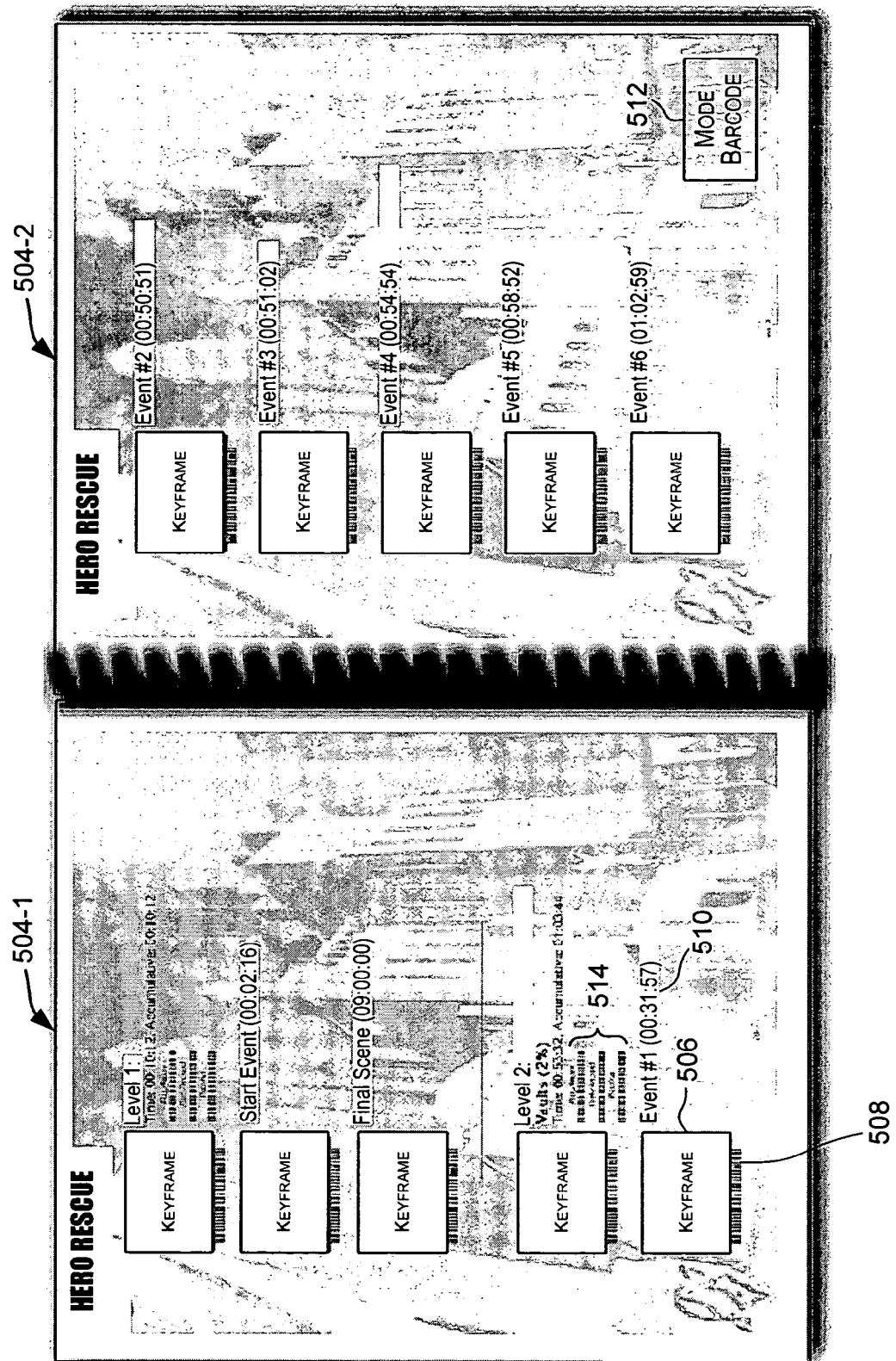

FIGS. 5A and 5B depict an example of a static representation that may be generated and printed on a paper medium for a simulation according to an embodiment of the present invention. The embodiments depicted in FIGS. 5A and 5B are merely illustrative of embodiments of the present invention and are not intended to limit the scope of the present invention as recited in the claims. Other variations, modifications, and alternatives are also within the scope of the present invention.

As depicted in FIG. 5A, a guide book or booklet 500 is generated for a player 502 to document the player's game playing experience. In FIG. 5A, booklet 500 is generated for the "Hero Rescue" game played by a player "Jamey".

FIG. 5B depicts two pages 504-1 and 504-2 from booklet 500. The static representation printed on the pages is a collection of levels portrayed like chapters in a book. For each level, relevant events are shown. Information identifying each event is provided. A visual representation 506 is provided for each event. In FIG. 5B, the visual representation for an event is a keyframe extracted from the video information portion of the time-based media information generated by execution of the game approximately around the time when the event occurs. The time 510 when each event approximately occurs in the time-based media information is also provided next to information identifying the event.

A tag 508 is also printed for each event. In FIG. 5B barcodes are used to implement the tags. Other techniques may be used in alternative embodiments. Tag 508 for an event encodes the approximate time during the game play when the event occurs. Depending upon the mode of operation, tags 508 may be scanned using a barcode reader to either restart the game from a time corresponding to the scanned tag or to initiate replay of previously recorded time-based media information from a time corresponding to the scanned time tag. In this manner, pages 504-1 and 504-2 provide a paper interface for replaying time-based media information recorded for a game execution or restarting the game. A set of tags 514 is also provided for controlling the playback of the information.

A tag 512 ("mode tag") is provided for switching between replay mode and restart mode. Scanning mode tag 512 toggles the present mode of operation. For example, if the present mode of operation is "replay" mode, then scanning mode tag 512 changes the mode to a "restart" mode, and vice versa. In alternative embodiments, more than two modes of operation may be provided and multiple tags may be used for switching between modes.

A player may wish to generate representations such as those depicted in FIGS. 3, 4, 5A, and 5B for one or more games completed by the user to document the user's game playing experience. For example, the booklet depicted in FIGS. 5A and 5B may act as a walkthrough of the game for the player. Walkthroughs are very popular in the gaming industry as they enable players to show their expertise in games. Walkthroughs also act to guide other players through a game and thus improve the satisfaction and reduce the frustration of playing a game. Walkthroughs include screenshots with descriptions of the various levels. Walkthroughs are commonly shared online through game web sites. They are also used at video gaming tournaments. Conventionally, walkthroughs are manually generated by players. Embodiments of the present invention enable paper documents for walkthroughs to be automatically generated. Further, unlike conventional walkthroughs, the walkthrough paper documents generated by embodiments of the present invention provide a paper-based interface for either replaying a previously recorded portion of the game from a player-selectable time point or for restarting the game from a player-selectable time point.

As described above, various paper-based static representations may be generated for simulations such as video games. These paper-based representations may be used to perform various operations on the simulation or the time-based media information generated by the simulations. For example, a user may use the paper-based interface to replay a portion of previously recorded time-based media information for a simulation. A user may also use the paper-based interface to restart execution of the simulation program from a particular user-selectable time point. FIGS. 6A, 6B, and 6C depict various execution paths that may result from restarting a game from different time points according to an embodiment of the present invention. The figures also help to show the differences between a replay operation and a restart operation.

FIG. 6A represents a path of execution of a simulation program by simulation engine 102. The simulation represented by FIG. 6A may be the execution of a video game. As depicted in FIG. 6A, the simulation executes from a time point T1 to a time point T2 that is temporally after T1. For example, if the simulation is a video game comprising a total of ten different levels of play, a user may start the game from the first level and then stop playing the game after the user finishes the third level. In this scenario, T1 marks the time at the start of the game and T2 mark the time when the user ends the third level. The line depicted in FIG. 6A from T1 to T2 represents the execution path for the execution of the simulation program from T1 to T2.

Time-based media information and state information may be recorded during the simulation from T1 to T2. The state information may be temporally synchronized with time-based media information. A visual static representation may then be generated for the simulation run from T1 to T2. The static representation may then be printed on a paper medium. As described above, the static representation may comprise time tags corresponding to times T1 and T2 and time points between T1 and T2. A user may then select a particular time tag printed on the paper document and replay a portion of the previously recorded time-based media information for the simulation run from T1 to T2. For example, if a user selects a time tag corresponding to time T3, then the portion of time-based media information recorded from T3 to T2 may be played back, possibly using a media player.

According to the teachings of the present invention, the user may also restart execution of the simulation program from a time point between T1 and T2 using the paper document on which the static representation of time-based media information for the run from T1 to T2 is printed. For example, the user may scan a "mode" tag on the paper document to enter "restart" mode. The user may then scan a time tag corresponding to a time point T3, where T3 is between T1 and T2 (T3 may also be equal to T1 or T2). Upon scanning a tag corresponding to time T3, the execution of the simulation program is restarted from time T2.

As depicted in FIG. 6B, restarting a simulation at T3 causes a new execution path to be branched from first simulation path (T1 to T2) at approximately time T3. The starting state of the simulation at the start (i.e. at T3) of the new execution path is the same as the state of the simulation at time T3 during the previously executed path from T1 to T3. The state information captured for the execution of the simulation program from T1 to T2 may be used to determine the state of the simulation at time T2. The new execution path is started based upon the state information determined for T2 during the previous execution. A user may then continue to run the simulation until time point T4. For example, if the simulation is a video game, and T1 represents the time point at the start of the first level of the game and T2 represents the time point at the end of the third level, the user may wish to restart from the third level and time T3 may correspond to the time at the start of the third level. The user may then continue playing the game until level 4 is completed, in which case T4 represents the time at the completion of level 4. Time-based media information and state information may be recorded for the simulation execution path from T3 to T4.

A static representation may then be generated for the latest execution path of the game. The latest execution path is from time T1 to T3 followed by the execution path from time T3 to T4. The time-based media information corresponding to the latest simulation execution path is the time-based media information recorded for the execution of the simulation from T1 to T3 and the time-based media information recorded for the execution of the simulation from T3 to T4. The static representation for the latest execution may then be printed on a paper medium. As described above, the static representation may comprise time tags corresponding to times T1 and T4 and time points between T1 and T4.

A user may then select a particular time tag printed on the paper document and replay a portion of the time-based media information recorded for the simulation run from T1 to T4. If time tag T1 is selected, then the time-based media information played back will be the time-based media information for T1 to T3 followed by the time-based media information for T3 to T4. If a tag corresponding to time T5 is selected for replay, then a portion of the time-based media information recorded from time T5 to T4 is replayed.

Instead of replaying the time-based media information from time T5, the user may instead request restart of the simulation from time T5. This causes a new execution path to be branched from the execution path from T3 to T4 at approximately time T5. The starting state of the simulation at the start (i.e. at T5) of the new execution path is the same as the state of the simulation at time T5 during the previously executed path from T3 to T4. The state information captured up to time point T5 from a previous execution(s) may be used to determine the state of the simulation at time T5. The new execution path is started based upon the state information determined for T5. Simulation engine 102 may then execute a new path from time T5 to time point T6, as shown in FIG. 6C. Time-based media information and state information may be recorded for the simulation execution path from T5 to T6.

As depicted in FIGS. 6A, 6B, and 6C and described above, various execution paths may result from restarting the execution of the simulation program from specified time points during previous execution paths of the simulation program. For the execution paths depicted in FIGS. 6A, 6B, and 6C, the "latest" run execution path is the path from T1 to T3, followed by T3 to T5, followed by T5 to T6. Accordingly, if the user requests generation of a static representation for the "latest" run, then the time-based media information used for generating the static representation is the time-based media information recorded for the execution from T1 to T3, followed by T3 to T5, followed by T5 to T6. A portion of the time-based media information may be replayed using the paper medium on which the static representation is printed. The paper document may also be used to restart the simulation from a time point from T1 to T3, T3 to T5, and T5 to T6. The simulation can thus be restarted using a paper interface from any time point during the duration of a previously completed simulation.

Figure 7:
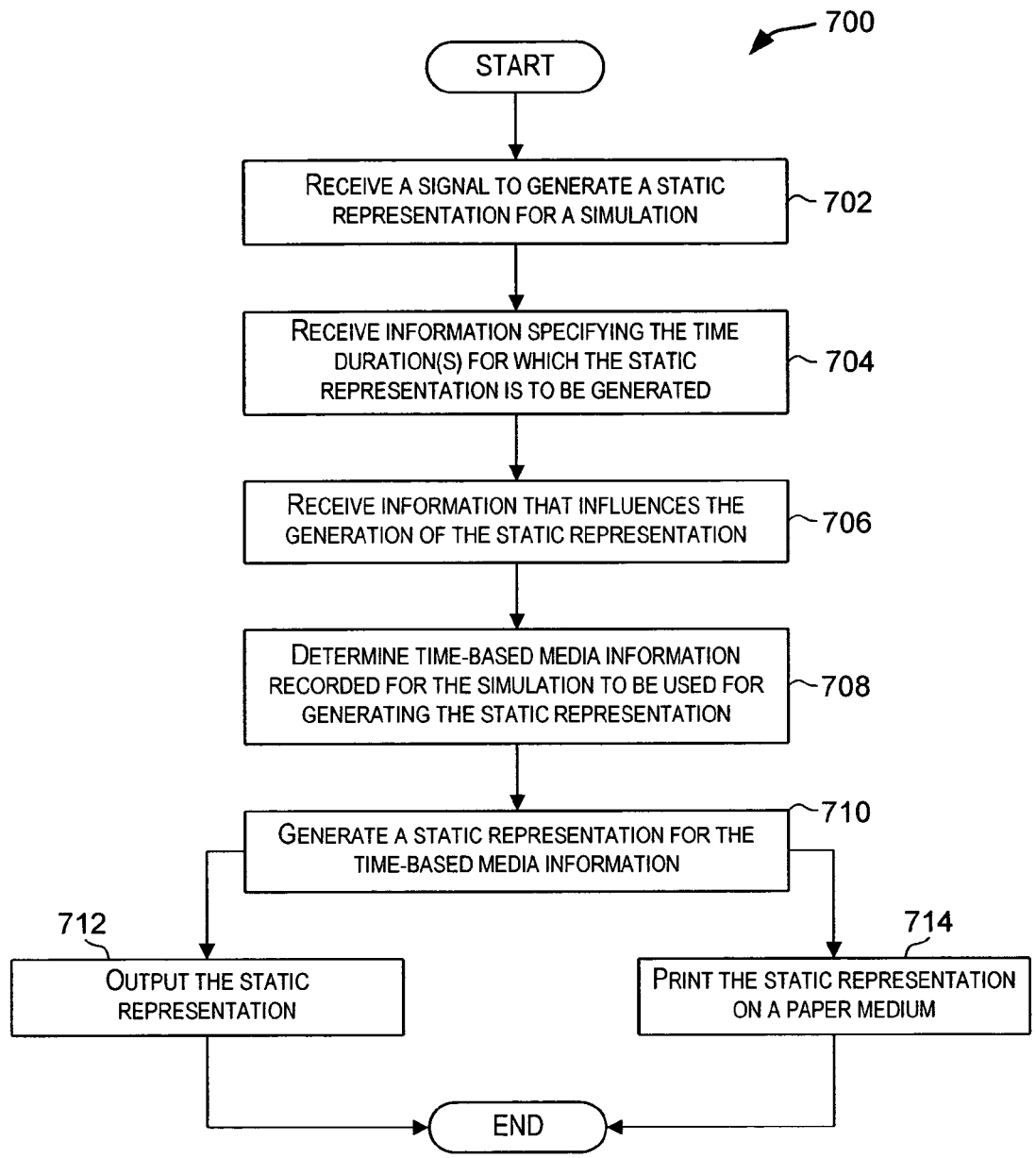
FIG. 7 is a simplified high-level flowchart depicting a method of generating a static representation for a simulation according to an embodiment of the present invention.

FIG. 7 is a simplified high-level flowchart 700 depicting a method of generating a static representation for a simulation according to an embodiment of the present invention. The method depicted in FIG. 7 may be performed by software code modules or instructions executed by a processor, hardware modules, or combinations thereof. Flowchart 700 depicted in FIG. 7 is merely illustrative of an embodiment of the present invention and is not intended to limit the scope of the present invention. Other variations, modifications, and alternatives are also within the scope of the present invention. The method depicted in FIG. 7 may be adapted to work with different implementation constraints.

As depicted in FIG. 7, processing is initiated upon receiving a signal to generate a static representation for a simulation (step 702). Static representations may be generated for various different kinds of simulations such as video games, flight simulations, etc. The signal may identify the simulation for which the static representation is to be generated.

Information may be received specifying the time duration(s) of the simulation for which the static representation is to be generated (step 704). Various user interfaces may be provided to enable the user to specify the time duration(s) for which the static representation is to be generated. For example, a user interface such as the print dialog box depicted in FIG. 2 may be provided to enable a user to specify the time durations. Using print dialog box 202, a user may specify a time duration for which a static representation is to be generated by specifying the start point and the end point of the time duration. Non-contiguous time durations may also be specified. For example, for a particular simulation, multiple non-contiguous time durations may be specified, each duration identified by a start time and an end time. In situations where a specific time duration is not specified, the static representation may be generated for the full time-based media information.

Other information that influences the generation of the static representation may also optionally be received (step 706). The other information may include for example layout and style information, print parameters, etc. The layout and style information may specify the layout, format, and styles to be used for generating the static representation. Print parameters may identify the paper medium on which the static representation is to be printed, the size of the paper medium (e.g., A4 size paper, 8½ by 11 size paper), whether the static representation is to be printed in landscape or portrait format, the properties of a printer that is to be used for the printing, etc.

If specific events that occur during the simulation are to be included in the static representation then information identifying those events may be received. U.S. application Ser. No. 11/021,303, depicts examples of the different kinds of information that influences generation of static representation and that may be received in 706 according to an embodiment of the present invention.

Although steps 702, 704, and 706 are shown as being performed sequentially in FIG. 7, the steps may be performed in any order or even in a single step.

The time-based media information to be used for generating the static representation is then determined (step 708). As described above, with regards to FIGS. 6A, 6B, and 6C, multiple execution paths may exist for a simulation application. Accordingly, in 708, a specific execution path and time-based media information corresponding to the execution path is determined.

In one embodiment, in the default mode, the "latest" execution run may be selected for generation of the static representation. For example, in FIG. 6C, the execution path from T1 to T3, T3 to T5, and T5 to T6 represents the "latest" path and its corresponding time-based media information may be selected for generation of the time-based media information. A portion (which may be the entire time-based media information) of the determined time-based media information is then selected corresponding to the time durations specified for static representation generation. In alternative embodiments, if multiple execution paths exist, the user may be prompted to select a particular execution path for generation of the static representation from a list of available execution paths.

A static representation is then generated for the time-based media information determined in 708 (step 710). The information received in 706 may be used to generate the static representation. Examples of techniques that may be used to generate a static representation in 710 are described in the various applications incorporated herein by reference. The static representation generated in 710 may have all or some of the features of static representations described above.

The static representation generated in 710 may be output to a user via a display device (step 712) or may be printed on a paper medium (step 714) to generate a paper document on which the static representation is printed. The printed paper document may then be used to replay or restart the simulation.

Figure 8:
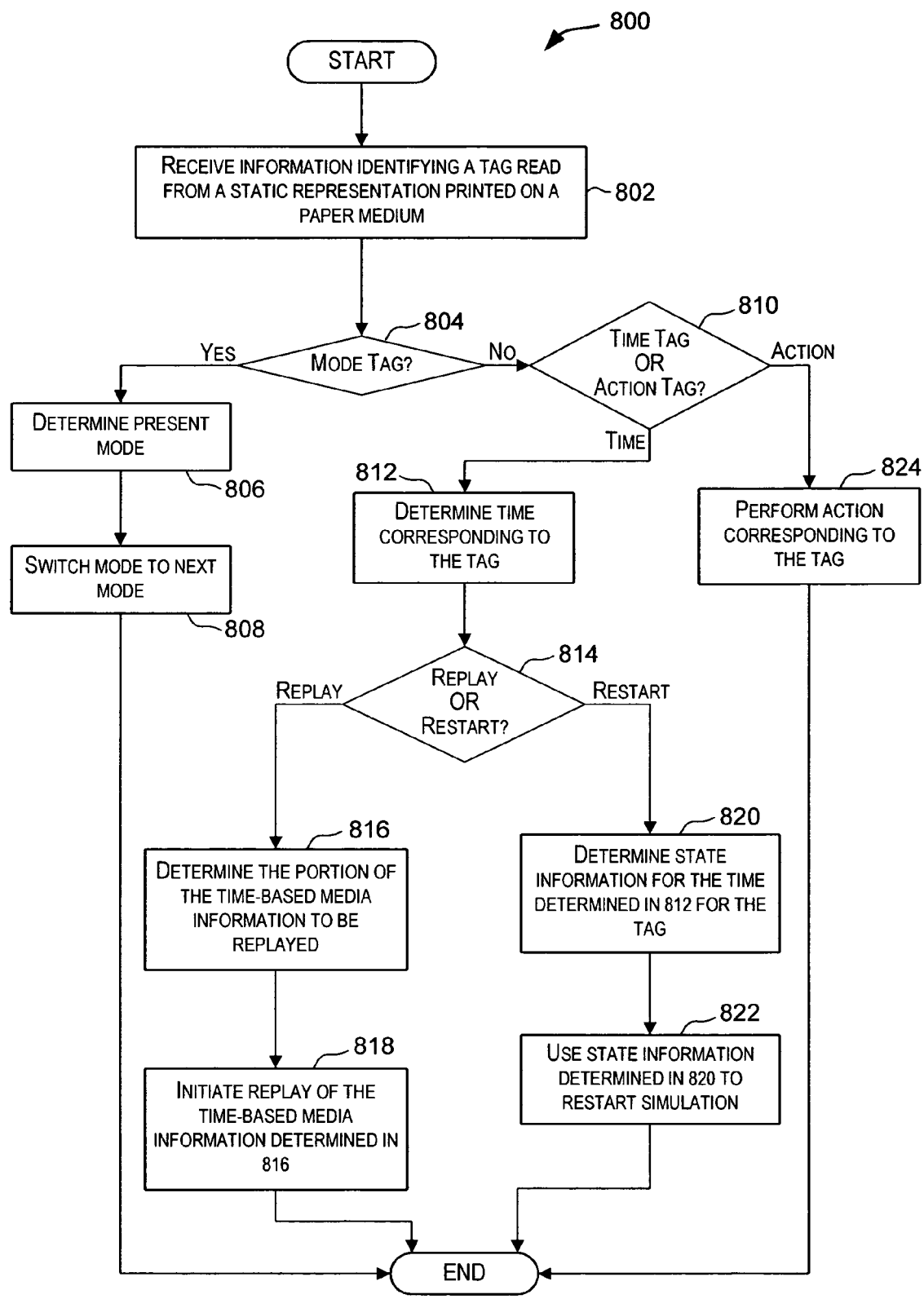
FIG. 8 is a simplified high-level flowchart depicting a method of processing tags read from a static representation printed on a paper medium according to an embodiment of the present invention.

FIG. 8 is a simplified high-level flowchart 800 depicting a method of processing tags read from a static representation printed on a paper medium according to an embodiment of the present invention. The method depicted in FIG. 8 may be performed by software code modules or instructions executed by a processor, hardware modules, or combinations thereof. Flowchart 800 depicted in FIG. 8 is merely illustrative of an embodiment of the present invention and is not intended to limit the scope of the present invention. Other variations, modifications, and alternatives are also within the scope of the present invention. The method depicted in FIG. 8 may be adapted to work with different implementation constraints.

Processing is initiated upon receiving information identifying a tag read from a paper medium (step 802). The tag may be read from a paper document on which a static representation is printed. However, the static representation is not essential for the present invention. For example, a paper page may simply have only one or more tags printed on it, each tag corresponding to a time point. The information received in 802 may be received responsive to a tag being read from such a paper page. Various different types of tags and tag readers may be used. In the static representations shown in FIGS. 3, 4, and 5B, the tags are in the form of barcodes. These tags may be read by a device configured to read barcodes (e.g., a barcode reader).

A check is then made to see if the tag that is read is a tag that enables activation of modes (referred to as a "mode tag") (step 804). If the tag is determined in 804 to be a mode tag, then the present mode of operation is determined (step 806). If the mode tag is used to toggle between modes, then the present mode is then switched to the next mode (step 808). Alternatively, if the mode tag identifies a specific mode then the mode corresponding to the mode tag may be activated in 808.

The number of modes that are provided may be different in different embodiments. As described above, in one embodiment, a replay mode and a restart mode are provided, and a single mode tag is provided for toggling between the two modes. For example, if the present mode determined in 806 is "replay" mode, then in 808 the mode is switched to "restart" mode. If the present mode determined in 806 is "restart" mode, then in 808 the mode is switched to "replay" mode.

In alternative embodiments, separate mode tags may be provided for activating different modes. For example, a "replay mode tag" may be printed in the static representation for activating replay mode and a separate "restart mode tag" may be printed for activating replay mode. Based upon the scanned mode tag, the corresponding mode is activated.

More than two modes may be provided in alternative embodiments. The static representation printed on the paper medium may comprise a single mode tag such that scanning the tag cycles through the various available modes. In alternative embodiments, a separate tag may be provided for each mode for activating that mode.

If it is determined in 804 that the tag is not a mode tag, then a check is made to see if the tag is a time tag or an action tag (step 810). A time tag is a tag encoding or representing a particular time, for example, tags 308 (FIG. 3), tags 402 (FIG. 4), tags 508 (FIG. 5B). An action tag is a tag that encodes information identifying an action to be performed, for example tags 316 (FIG. 3), tags 514 (FIG. 5B).

If the tag is determined in 810 to be a time tag, then the time corresponding to the tag is determined (step 812). Assuming that there are two possible modes, i.e., replay mode and restart mode, a check is then made to determine whether the present mode is a replay mode or restart mode (step 814).

If the mode is determined to be "replay" mode, then a portion of time-based media information to be replayed in response to the scanned tag is determined (step 816). The processing in 816 involves determining time-based media information for the simulation for which replay is requested and determining the portion of the time-based media information to be replayed.

As described above (as depicted in FIGS. 6A, 6B, and 6C), multiple execution paths may exist for a simulation program and the time determined for the time tag in 812 may represent a time point in more than one execution path. In such a scenario, as part of 816, a determination is made as to which specific execution path is to be selected for replay. In one embodiment, by default, the latest simulation path is selected. As previously described, the time-based media information for the latest execution path of the simulation may be the concatenation of time-based media information recorded previously for separate execution path time segments concatenated together. For example, for the execution paths depicted in FIG. 6C, the time-based media information for the latest execution path is the concatenation of the time-based media information recorded from T1 to T3, followed by T3 to T5, followed by T5 to T6.

Embodiments of the present invention also enable replay of time-based media information for execution paths other than the latest execution path. For example, in one embodiment, in addition to specifying a time point, the time tag may also convey information identifying a specific execution path for which replay is requested. The specific execution path may be some path other than the latest path. For example, for the execution paths depicted in FIG. 6C, the execution path from T1 to T3 and T3 to T4 may be specified. In this case, the time-based media information for the execution path is the time-based media information recorded from T1 to T3 concatenated with the time-based media information recorded from T3 to T4. A portion of time-based media information corresponding to this execution path may be replayed from a time corresponding to the scanned time tag.

In alternative embodiments, information may be stored identifying the various execution paths for a simulation program. For a particular time point corresponding to the tag, a lookup table may be consulted to determine all the available execution paths for that time point. Information identifying the available execution paths may be provided to a user via a user interface. The user may then select a particular execution path for replay. Time-based media information for the user-selected execution path is then determined in 816 from previously recorded time-based media information for the simulation. The time-based media information for a specific path may comprise time-based media information concatenated from various time segments.

Time-based media information is accessed for the specific execution path for which information is to be replayed. From the time-based media information for the selected execution path, a portion of the time-based media information corresponding to the time represented by the scanned time tag is then determined. The entire time-based media information may be selected for replay if the time represented by the scanned time tag is the starting time of the simulation. Alternatively, a portion of the time-based media information (from the time represented by the scanned time tag) may be selected for replay.

Playback or replay of the time-based media information determined in 816 is then initiated (step 818). Replaying the time-based media information causes playback of the previously recorded time-based media information determined in 816. Various techniques may be used to replay the time-based media information. In one embodiment, an application (e.g., a media player) may be invoked for replaying the time-based media information. In another embodiment, the simulation engine 102 may be used to replay the time-based media information. For example, the replay may be output via output device 104 (see FIG. 1) coupled to simulation engine 102. Other techniques may also be used to replay the time-based media information corresponding to the time tag.

Referring back to step 814, if it is determined that the present mode is the restart mode, then state information corresponding to the time represented by the time tag is determined from previously recorded state information (step 820). As previously indicated, multiple execution paths may exist for a simulation program. In such a scenario, the time point determined in 812 for the tag may represent a time point in more than one execution path. In such a scenario, as part of 820, a determination is made as to which specific execution path is to be selected for restarting execution of the simulation program. In one embodiment, by default, the latest simulation path is selected and state information determined for the selected path. The state information for the latest execution path of the simulation may be the concatenation of state information recorded previously for separate execution path time segments. For example, for the execution paths depicted in FIG. 6C, the state information for the latest execution path is the concatenation of state information recorded from T1 to T3, followed by T3 to T5, followed by T5 to T6.

Embodiments of the present invention also enable restart from an execution path other than the latest execution path. For example, in one embodiment, in addition to specifying a time point, the time tag may also convey information identifying a specific execution path from which restart is desired. The specific execution path may be some path other than the latest path. For example, for the execution paths depicted in FIG. 6C, the execution path from T1 to T3 and T3 to T4 may be specified. In this case, the state information for the specified execution path is the state information recorded from T1 to T3 concatenated with the state information recorded from T3 to T4.

In alternative embodiments, as previously described, information may be stored identifying the various execution paths for a simulation program. For a particular time point corresponding to the tag, a lookup table may be consulted to determine all the available execution paths for that time point. Information identifying the available execution paths may be provided to a user via a user interface. The user may then select a particular execution path to be used for the restart operation. State information for the user-selected execution path is then determined in 820 from previously recorded state information for the simulation. The state information for a specific path may comprise state information concatenated from various time segments. The state information determined for a specific selected execution path is then used to determine the state information for the time corresponding to the tag.

Execution of the simulation program is then restarted from a time point corresponding to the tag using the state information determined for the time point in 820 (step 822). The restart causes the execution of the simulation program such that the starting state of the simulation at the start (i.e. at the time corresponding to the tag) of the new execution path is the same as the state of the simulation at the time corresponding to the tag during a previously executed simulation path that is specified or selected as the branch out point for the simulation restart. In one embodiment, the time corresponding to the tag and the relevant state information is communicated to simulation engine 102 which then restarts the simulation from the time corresponding to the tag. Other techniques may also be used to restart the simulation in alternative embodiments.

Referring back to 810, if it is determined that the tag is an action tag, then the action corresponding to the tag is performed (step 824). Various actions may be performed. For example, the actions performed may be related to controlling the replay or restart of the time-based media information.

In the manner described above, the paper medium on which a static representation is printed provides a paper-based interface for replaying portions of previously recorded time-based media information for a simulation from a particular user-selected time point (corresponding to the user-selected tag). The paper medium also provides a paper-based interface for restarting execution of a simulation program from a particular user-selected time point (corresponding to the user-selected tag) during a previous execution path of the simulation program. In this manner, random access to a simulation is provided for replay or for restart operations using a paper interface.

As described above, embodiments of the present invention provide a paper-based interface for restarting a simulation, with all the necessary simulation state information, from a user-selectable time point. For example, a player can restart a video game from a particular time point and continue playing the game from that time point onwards. Thus random access to the game itself is enabled. Various techniques have been described above for recording time-based media information generated by the execution of a simulation program such as a video game. Various techniques may also be used for capturing state information for a simulation, e.g. for capturing state information generated by execution of a game. In some embodiments, the capture of state information is built in to the simulation engine 102 that executes the game. The captured state information may then be used for subsequent restarts.

Many games also generate temporary state files during game execution. The state files are named according to the progressive state of the game. These state files are sometimes used as "map" (or level) files in a game as they contain the data corresponding to a particular player's state for that level. A level in a game may comprise several sublevels. For example, if a particular game has 18 levels, each level may contain several sublevels which must be completed to complete the entire level. During game play, state files may be generated and stored for the various mini-levels within a single level. During a player's game play in a level, and as sublevels within that level are completed, several state files are generated after each mini-level completion and stored. The state files may be stored in a special directory called SAVE. Accordingly, for each level, several files may be stored which save the state of the game for that level. The files are generally uniquely named to identify the level and the sublevel to which they correspond. For example, the following files may be stored:

L1A.HL1, L1A.HL2, L1A.HL3→Files for sublevel "A" within level L1

L1B.HL1, L1B.HL2, L1B.HL3→Files for sublevel "B" within level L1, etc.

In addition to the files for the levels and sublevels, state information for a game execution may also be stored in other files. For example, a portion of the state information may be stored in the "autosav.sav" file.

A special daemon or background process may be configured to detect the creation of such state files and other files storing state information during the execution of a game. Such files may be captured and stored for the various execution paths. An entry for each captured file may be made in a log file. Such a log file could be a XML file used for recording state information. Accordingly, using this technique, the state information for a game is captured by capturing the files generated during the game containing the state information.

In alternative embodiments, a special program may be written (e.g., a hook) to capture the state information from the simulation engine itself during execution of the simulation. For example, for a video game, system development kits (SDKs) provided by gaming companies may be used to develop such hook programs. The "hooks" may be used to capture state information.

When a signal is received to restart a game from a particular time point, the previously captured state files are determined for a previous execution path from which restart is to be performed. These state files are used to determine the state for the particular time point. The state information determined for the particular time point is then used to restart the simulation program execution. The determined state files may then be copied to a startup directory that is used by the simulation engine to load the game. Special command files (e.g., autoexec.cfg) that are automatically loaded when a game is started may also be created to facilitate the loading process. Customization of some game parameters may be performed. For example, the following command is placed in the autoexec.cfg file: "map L1B". This automatically loads files captured for level and sublevel corresponding to L1B from a directory (e.g., the SAVE directory) to restart the game from that level and sublevel.

In some games, a player is able to manually save state information, for example by manually pressing the F6 button while playing a game. The state information is usually stored in a file called "quicksave.sav". This file may also be captured and used to restart the game.

In alternative embodiments, state information for a simulation such as a game may also be captured using MODs. A MOD is a modification that someone has made to a game. For example, MODs are developed by gamers to incorporate new weapons, new levels (maps), and/or new methods or rules for playing the game. Many games provide SDKs for creating MODs. Several software tools supported by gamer communities may also be used for creating MODs. A MOD is like a "hook" program that may be used to capture state information during the execution of a game. According to an embodiment of the present invention, a MOD may be created that is configured to collect state information during a game. The state information may be collected and stored in such a way as to provide detailed information sufficient for reconstructing a timeline for each game level. The state information captured using MODs may then be used to restart games from a particular time point.

Figure 9:
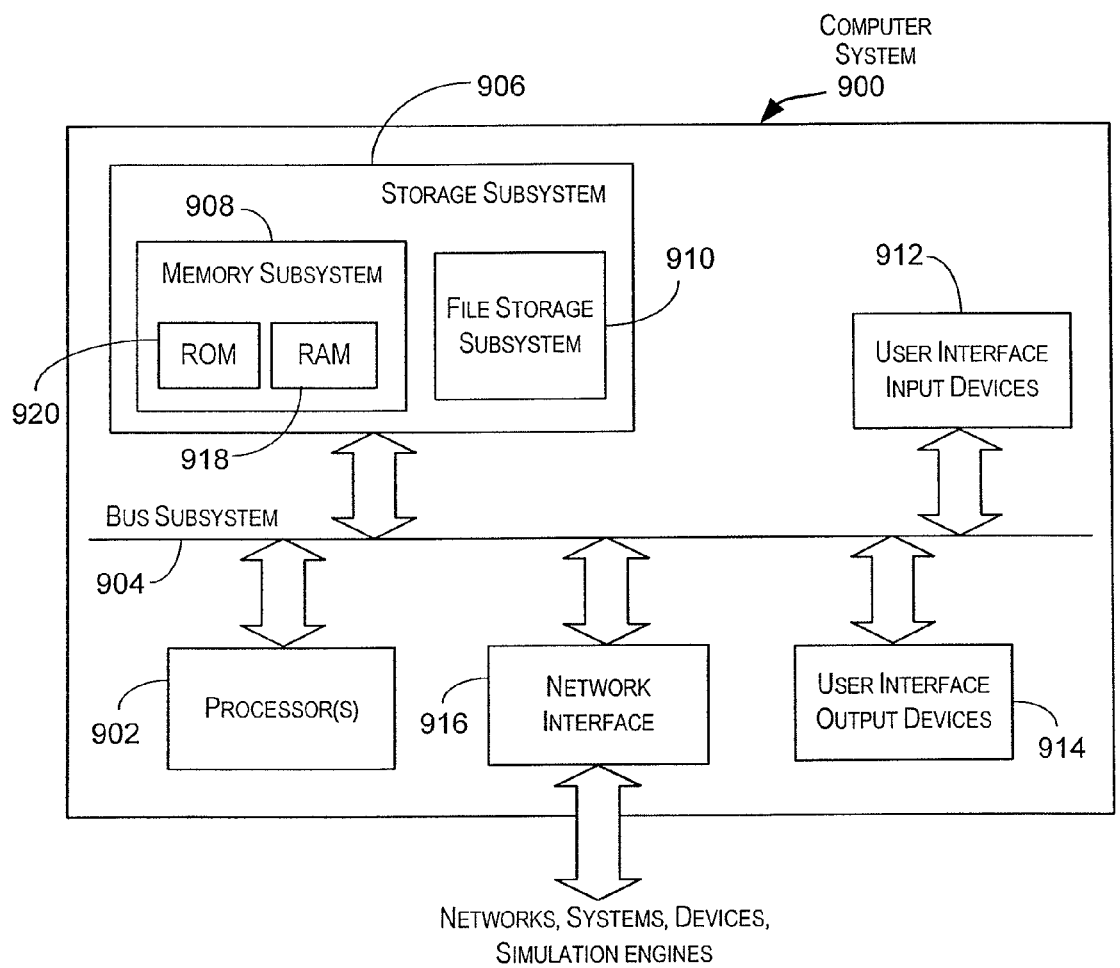
FIG. 9 is a simplified block diagram of a computer system that may be used to practice an embodiment of the present invention.

FIG. 9 is a simplified block diagram of a computer system 900 that may be used to practice an embodiment of the present invention. As shown in FIG. 9, computer system 900 includes a processor 902 that communicates with a number of peripheral devices via a bus subsystem 904. These peripheral devices may include a storage subsystem 906, comprising a memory subsystem 908 and a file storage subsystem 910, user interface input devices 912, user interface output devices 914, and a network interface subsystem 916.

Bus subsystem 904 provides a mechanism for letting the various components and subsystems of computer system 900 communicate with each other as intended. Although bus subsystem 904 is shown schematically as a single bus, alternative embodiments of the bus subsystem may utilize multiple busses.

Network interface subsystem 916 provides an interface to other computer systems, networks, devices, simulation engines, etc. Network interface subsystem 916 serves as an interface for receiving data from and transmitting data to other systems from computer system 900.

User interface input devices 912 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 900.

User interface output devices 914 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 900. The output devices may be used to playback time-based media information.

Storage subsystem 906 may be configured to store the basic programming and data constructs that provide the functionality of the present invention. Software (code modules or instructions) that provides the functionality of the present invention may be stored in storage subsystem 906. These software modules or instructions may be executed by processor(s) 902. Storage subsystem 906 may also provide a repository for storing data used in accordance with the present invention. Storage subsystem 906 may comprise memory subsystem 908 and file/disk storage subsystem 910.

Memory subsystem 908 may include a number of memories including a main random access memory (RAM) 918 for storage of instructions and data during program execution and a read only memory (ROM) 920 in which fixed instructions are stored. File storage subsystem 910 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 900 can be of various types including a personal computer, a portable computer, a workstation, a network computer, a mainframe, or any other data processing system. Due to the ever-changing nature of computers and networks, the description of computer system 900 depicted in FIG. 9 is intended only as a specific example for purposes of illustrating the preferred embodiment of the computer system. Many other configurations having more or fewer components than the system depicted in FIG. 9 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method performed by a computer system of initiating execution of a video game, the method comprising:
   receiving information identifying a bar code read from a paper document, the bar code comprising time information corresponding to an event in an execution path of a previously executed video game;
   determining a first time point using the time information;
   determining, from state information stored for the previously executed video game, first state information corresponding to a particular state of execution of the previously executed video game based on the first time point;
   accessing the first state information from the stored state information;
   causing a data processor in the computer system to execute the video game from the first time point using the first state information; and
   outputting images generated during execution of the video game to an output device.

2. The method of claim 1 wherein determining the first state information comprises:
   determining a first execution path of the video game for the first time point from a plurality of execution paths of the video game;
   determining state information for the first execution path from the state information stored for the video game; and
   determining the first state information for the first time point from the state information determined for the first execution path.

3. The method of claim 2 wherein determining the first execution path comprises:
   outputting information identifying the plurality of execution paths; and
   receiving information indicating selection of the first execution path from the plurality of execution paths.

4. The method of claim 2 wherein determining the first execution path comprises:
   determining the first execution path from the first tag.

5. The method of claim 1 further comprising:
   accessing time-based media information recorded for the previous execution of the video game;
   generating a static representation for the time-based media information, wherein the static representation comprises:
      a visual representation of a portion of the time-based media information;
      a set of tags, each tag representing a time point, the set of tags including the bar code; and
   printing the static representation on a paper medium to produce the paper document.

6. A method of replaying information, the method executed on a computer system, the method comprising:
   receiving information identifying a bar code read from a paper document, the bar code comprising time information corresponding to an event in an execution path of a previously executed video game;
   determining a first time point using the time information;
   determining, based upon the first time point, a portion of time-based media information recorded for the previously executed video game corresponding to a particular state of execution of the previously executed video game based on the first time point;
   accessing the portion of the time-based media information; and
   initiating replay of the portion of the time-based media information using an output device.

7. The method of claim 6 wherein determining the portion of time-based media information comprises:
   determining a first execution path of the video game for the first time point from a plurality of execution paths of the video game;
   determining time-based media information for the first execution path from the time-based media information recorded for the video game; and
   determining the portion of time-based media information from the time-based media information determined for the first execution path.

8. The method of claim 7 wherein determining the first execution path comprises:
   outputting information identifying the plurality of execution paths; and
   receiving information indicating selection of the first execution path from the plurality of execution paths.

9. The method of claim 7 wherein determining the first execution path comprises:
   determining the first execution path from the bar code.

10. The method of claim 6 further comprising:
    generating a static representation based upon the time-based media information for the previous execution of the video game, wherein the static representation comprises:
       a visual representation of the portion of the time-based media information; and
       a set of tags, each tag representing a time point, the sets of tag including the bar code; and
    printing the static representation on a paper medium to produce the paper document.

11. A method of performing an operation based upon information read from a paper document, the method comprising:
    receiving information identifying a bar code read from a paper document, the bar code comprising time information corresponding to an event in an execution path of a previously executed video game;
    determining a first time point using the time information;
    determining a present mode;
    if the present mode is determined to be a first mode:
       determining, from state information stored for a previous execution of the previously executed video game, first state information for the first time point corresponding to a particular state of execution of the previously executed video game based on the first time point;
       causing a data processor to execute the video game from the first time point using the first state information, including accessing the first state information from the stored stat information;
       outputting images generated during execution of the video game to an output device; and
    if the present mode is determined to be a second mode:
       determining, based upon the first time point, a portion of time-based media information recorded for the previously executed video game corresponding to the particular state of execution of the previously executed video game as indicated by the first time point;
       accessing the portion of the time-based media information;
       replaying the portion of the time-based media information; and outputting images generated during replay of the portion of the time-based media information to an output device.

12. The method of claim 11 further comprising:
receiving information identifying a second tag read from the paper medium; and
changing the present mode responsive to receiving the information identifying the second tag.

13. The method of claim 11 further comprising:
generating a static representation based upon the time-based media information for the previous execution of the video game, wherein the static representation comprises:
a visual representation of the portion of the time-based media information;
a set of tags, each tag representing a time point, the set of tags including the bar code; and
a second tag for switching between the first mode and the second mode; and
printing the static representation on a paper medium to produce the paper document.

14. A system for executing a video game, the system comprising:
a data processing system;
a simulation engine in communication with the data processing system; and
an output device;
wherein the data processing system is configured to:
receive information identifying a bar code read from a paper document, the bar code comprising time information corresponding to an event in an execution path of a previously executed video game;
determine a first time point using the time information;
determine, from state information stored for the previously executed video game, first state information corresponding to a particular state of execution of the previously executed video game based on the first time point; and
access the first state information from the stored state information;
wherein the simulation engine is configured to cause the data processing system to initiate execution of the video game from the first time point using the first state information;
wherein images generated during execution of the video game are presented on the output device.

15. The system of claim 14 wherein the data processing system is configured to determine the first state information by:
determining a first execution path of the video game for the first time point from a plurality of execution paths of the video game;
determining state information for the first execution path from the state information stored for the video game; and
determining the first state information for the first time point from the state information determined for the first execution path.

16. The system of claim 15 wherein determining the first execution path comprises:
outputting information identifying the plurality of execution paths; and
receiving information indicating selection of the first execution path from the plurality of execution paths.

17. The system of claim 15 wherein determining the first execution path comprises determining the first execution path from the bar code.

18. The system of claim 14 further comprising:
a printer device in communication with the data processing system;
wherein the data processing system is further configured to:
access time-based media information recorded for the previous execution of the video game;
generate a static representation for the time-based media information, wherein the static representation comprises:
a visual representation of a portion of the time-based media information;
a set of tags, each tag representing a time point, the set of tags including the bar code; and
wherein the printer device is configured to print the static representation on a paper medium to produce the paper document.

19. A system for replaying information, the system comprising:
a data processing system; and
an output device coupled to the data processing system;
wherein the data processing system is configured to:
receive information identifying a bar code read from a paper document, the bar code comprising time information corresponding to an event in an execution path of a previously executed video game;
determine a first time point using the time information;
determine, based upon the first time point, a portion of time-based media information recorded for the previously executed video game corresponding to a particular state of execution of the previously executed video game as indicated by the first time point; and
access the portion of the time-based media information;
wherein the output device is configured to replay the portion of the time-based media information.

20. The system of claim 19 wherein the data processing system is configured to determine the portion of time-based media information by:
determining a first execution path of the video game for the first time point from a plurality of execution paths of the video game;
determining time-based media information for the first execution path from the time-based media information recorded for the video game; and
determining the portion of time-based media information from the time-based media information determined for the first execution path.

21. The system of claim 19 further comprising a printer device coupled to the data processing system, wherein:
the data processing system is configured to generate a static representation based upon the time-based media information for the previous execution of the video game, wherein the static representation comprises:
a visual representation of the portion of the time-based media information; and
a set of tags, each tag representing a time point, the sets of tag including the bar code; and
the printer device is configured to print the static representation on a paper medium to produce the paper document.

22. A system for performing an operation based upon information read from a paper document, the system comprising:
a data processing system;
a simulation engine; and
an output device;
wherein the data processing system is configured to:
receive information identifying a bar code read from a paper document, the bar code comprising time information corresponding to an event in an execution path of a previously executed video game;

determine a first time point using the time information;

determine a present mode;

determine, from state information stored for the previously executed video game, first state information corresponding to the particular state of execution of the previously executed video game as indicated by the first time point and access the first state information from the stored state information, if the present mode is determined to be a first mode; and determine, based upon the first time point, a portion of time-based media information recorded for the previously executed video game corresponding to the particular state of execution of the previously executed video game as indicated by the first time point and access the portion of the time-based media information, if the present mode is determined to be a second mode;

wherein the simulation engine is configured to initiate execution of the video game from the first time point using the first state information if the present mode is determined to be the first mode; and wherein the output device is configured to replay the portion of the time-based media information if the present mode is determined to be a second mode.

23. The system of claim 22 wherein the data processing system is configured to:

receive information identifying a second tag read from the paper medium; and change the present mode responsive to receiving the information identifying the second tag.

24. The system of claim 22 further comprising a printer device, wherein:

the data processing system is configured to:

generate a static representation based upon the time-based media information for the previous execution of the video game, wherein the static representation comprises:

a visual representation of the portion of the time-based media information;

a set of tags, each tag representing a time point, the set of tags including the bar code; and a second tag for switching between the first mode and the second mode; and the printer device is configured to print the static representation on a paper medium to produce the paper document.

25. An apparatus for initiating execution of a video game, the apparatus comprising:

means for receiving information identifying a bar code read from a paper document, the bar code comprising time information corresponding to an event in an execution path of a previously executed video game;

means for determining a first time point using the time information;

means for determining, from state information stored for a previously executed video game, first state information corresponding to the particular state of execution of the previously executed video game based on the first time point;

means for accessing the first state information from the stored state information;

means for causing a data processor to execute of the video game from the first time point using the first state information; and an output device to display images generated during execution of the video game.

26. A computer-readable medium storing a plurality of instructions for controlling a data processor for initiating execution of a video game, the plurality of instructions comprising:

instructions that cause the data processor to receive information identifying a bar code read from a paper document, the bar code comprising time information corresponding to an event in an execution path of a previously executed video game;

instructions that cause the data processor to determine a first time point using the time information;

instructions that cause the data processor to determine, from state information stored for the previously executed video game, first state information corresponding to a particular state of execution of the previously executed video game based on the first time point;

instructions that cause the data processor to access the first state information from the stored state information;

instructions that cause the data processor to initiate execution of the video game from the first time point using the first state information; and instructions that cause the data processor to output images generated during execution of the video game to an output device.

* * * * *